US012712774B2

(12) United States Patent
Murali et al.

(10) Patent No.: US 12,712,774 B2
(45) Date of Patent: Aug. 18, 2026

(54) METHODS AND APPARATUS TO REDUCE CRESTS IN TRANSMISSION SIGNALS

(71) Applicant: Texas Instruments Incorporated, Dallas, TX (US)

(72) Inventors: Sriram Murali, Bangalore (IN); Aswath VS, Kannur (IN); Sreenath Narayanan Potty, Bangalore (IN); Raju K. Chaudhari, Bangalore (IN); Kapil Kumar, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/638,460

(22) Filed: Apr. 17, 2024

(65) Prior Publication Data

US 2025/0039027 A1 Jan. 30, 2025

(30) Foreign Application Priority Data

Jul. 28, 2023 (IN) ............................ 202341051102

(51) Int. Cl.
*H04L 27/26* (2006.01)
*H04B 1/04* (2006.01)

(52) U.S. Cl.
CPC ....... *H04L 27/2614* (2013.01); *H04B 1/0475* (2013.01)

(58) Field of Classification Search
CPC ............ H04L 27/2614; H04L 27/2623; H04B 1/0475; H04B 1/04; H04B 2001/0416
USPC ................................ 375/260, 295–297, 350
See application file for complete search history.

(56) References Cited

U.S. PATENT DOCUMENTS

2007/0201582 A1* 8/2007 Okada ....................... H04L 5/06 375/308
2009/0225898 A1* 9/2009 Abe ....................... H04B 1/707 375/296
2009/0316827 A1* 12/2009 Ishikawa ............. H04L 27/2623 375/296
2010/0158166 A1* 6/2010 Gandhi ................. H03F 1/3241 375/345
2011/0255627 A1* 10/2011 Gotman .............. H04L 27/2624 375/285

(Continued)

OTHER PUBLICATIONS

Väänänen, Olli, "Digital Modulators with Crest Factor Reduction Techniques," Helsinki University of Technology, Electronic Circuit Design Laboratory Report 42, Espoo 2006, Dissertation presented Mar. 17, 2006, 127 pages.

*Primary Examiner* — Emmanuel Bayard
(74) *Attorney, Agent, or Firm* — Xianghui Huang; Frank D. Cimino

(57) ABSTRACT

An example apparatus to reduce crests in an input signal includes: memory; and programmable circuitry configured to: store a first copy and a second copy of a normalized window waveform in the memory, the first copy of the normalized window waveform including more data points than the second copy of the normalized window waveform; use the second copy of the normalized window waveform to generate a weight corresponding to a peak in the input signal; use the weight and the first copy of the normalized window waveform to generate an output waveform; generate a peak limiting waveform responsive to the output waveform; and combine the peak limiting waveform with the input signal to reduce an amplitude of the peak.

20 Claims, 13 Drawing Sheets

(56) References Cited

U.S. PATENT DOCUMENTS

| | | | | |
|---|---|---|---|---|
| 2012/0093210 | A1* | 4/2012 | Schmidt | H04L 27/2624 375/224 |
| 2014/0044215 | A1* | 2/2014 | Mundarath | H04L 27/2624 375/297 |
| 2017/0026216 | A1* | 1/2017 | Zhao | H04L 5/005 |
| 2019/0013981 | A1* | 1/2019 | Fehri | H04L 5/0007 |
| 2022/0217031 | A1* | 7/2022 | Wang | H04L 27/2623 |
| 2023/0344695 | A1* | 10/2023 | Shih | H04L 27/2624 |
| 2024/0223228 | A1* | 7/2024 | Rajamani | H04L 27/2624 |

* cited by examiner

700

$r_1$ $|x(n)|$

704

$r_2$ $a_1 = \frac{\lambda}{r_1}$ $a_2 = \frac{\lambda}{r_2}$ $\lambda$

1

317 b_w(n)

706

$|y(n)|$ n

METHODS AND APPARATUS TO REDUCE CRESTS IN TRANSMISSION SIGNALS

CROSS-REFERENCE TO RELATED APPLICATION

This patent application claims the benefit of and priority to Indian Provisional Patent Application Serial No. 202341051102 filed Jul. 28, 2023, which Application is hereby incorporated herein by reference in its entirety.

TECHNICAL FIELD

This description relates generally to transmitters, and, more particularly, to methods and apparatus to reduce crests in transmission signals.

BACKGROUND

Wireless communications technology enables a wide variety of electronic devices (e.g., mobile phones, tablets, laptops, etc.) to support the execution of increasingly diverse and complex workloads. The secure, efficient, and accurate exchange of information over a wireless medium includes technical challenges. One such technical challenge is power consumption. In general, the amount of power consumed by a transmitter device increases as the amplitude of its output signal increases.

SUMMARY

For methods and apparatus to reduce crests in transmission signals, an example apparatus includes memory; and programmable circuitry configured to: store a first copy and a second copy of a normalized window waveform in the memory, the first copy of the normalized window waveform including more data points than the second copy of the normalized window waveform; use the second copy of the normalized window waveform to generate a weight corresponding to a peak in the input signal; use the weight and the first copy of the normalized window waveform to generate an output waveform; generate a peak limiting waveform responsive to the output waveform; and combine the peak limiting waveform with the input signal to reduce an amplitude of the peak.

BRIEF DESCRIPTION OF THE DRAWINGS

The same reference numbers or other reference designators are used in the drawings to designate the same or similar (functionally or structurally) features.

DETAILED DESCRIPTION

Figure 1:
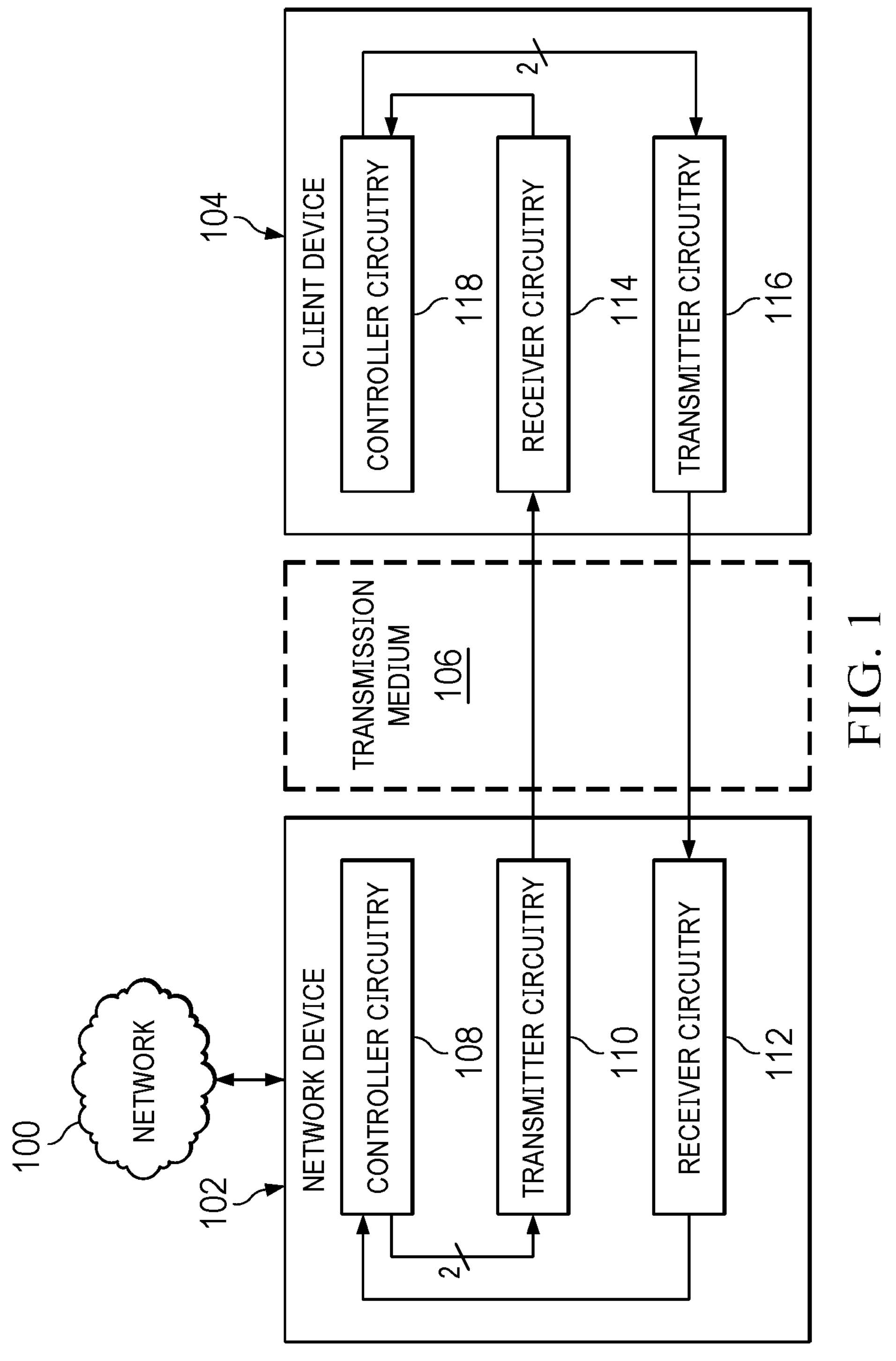
FIG. 1 is a block diagram of an example environment including a client device and a base station.

The drawings are not necessarily to scale. Generally, the same reference numbers in the drawing(s) and this description refer to the same or like parts. Although the drawings show regions with clean lines and boundaries, some or all of these lines and boundaries may be idealized. In reality, the boundaries and lines may be unobservable, blended or irregular.

One parameter significantly affecting the power consumption of transmitter devices is Peak-to-Average power Ratio (PAR). PAR is determined by a) squaring the peak amplitude of the transmitter output signal to obtain the peak power consumed, b) calculating the mean square value of the transmitter output signal to obtain the average power consumed, and c) dividing the peak power consumed by the average power consumed. Generally, the performance of power amplifier circuitry within transmitter devices decreases as PAR increases. As a result, industry members seek to produce transmitters with low PAR.

Some transmitter devices maintain a low PAR by decreasing the amplitude (e.g., the magnitude) of peaks within the input signal before transmitting an output signal across a transmission medium. Decreasing the magnitude of peaks of the input signal lowers the PAR and improves the performance of the transmitter. As used herein, techniques used to modify an input signal as described above may be referred to as Crest Factor Reduction (CFR).

Industry members employ a variety of CFR techniques to lower PAR. One such technique is Pulse Cancelling CFR (PC-CFR) techniques, which may also be referred to as Peak Cancelling CFR (PC-CFR). PC-CFR techniques include computing a cancelling pulse by employing a Peak Cancellation Waveform (PCW) responsive to attributes of the input signal; and adding the cancelling pulse to the input signal in a direction opposite the peak. To ensure other quality metrics (e.g., Error Vector Magnitude (EVM), Adjacent Channel Leakage Ratio (ACLR)) of the output signal remain within acceptable limits after such operations, transmitter devices using PC-CFR techniques are required to ensure that energy in the PCW lies within the same frequency band as the original input signal. While some transmitter devices are implemented into systems that provide such frequency profile information necessary to compute a PCW, other transmitter devices are implemented in systems that do not provide frequency profile information. Accordingly, transmitter devices that rely singularly on PC-CFR to maintain a low PAR can only be implemented in a limited number of use cases.

As used herein, frequency profile information includes information about the spectral occupancy of a signal to be transmitted. Frequency profile information may include, but is not limited to, a number of carriers used to transmit the signal, the bandwidths of the carriers, and the relative power levels of the carriers. PC-CFR is described further in connection with FIG. 8.

Some transmitter devices use Windowed CFR (W-CFR) techniques as an alternative to PC-CFR. W-CFR involves computing a Peak Limiting Waveform (PLW) responsive to attributes of the input signal and multiplying the PLW to the input signal. Because pulse cancellation is additive, PC-CFR techniques require the design of a PCW that is matched to the frequency profile of the transmit signal to avoid violating spectral emission limits. In contrast, W-CFR techniques multiply PLWs to attenuate peaks. Multiplication in time corresponds to convolution in frequency, which can lead to a form of noise called spectral smearing. However, the smearing effect occurs independently of the underlying signal frequency profile.

Accordingly, a transmitter device can avoid violating spectral emission requirements by selecting a suitable PLW independently of the signal frequency profile. Such generality of W-CFR comes at a cost in that, for a given PAR target and acceptable emission (ACLR) levels, W-CFR techniques generally perform worse (e.g., have a higher EVM) than PC-CFR techniques. However, transmitter devices can generate PLWs without frequency profile information, so W-CFR techniques can be applied to a wider variety of use cases than PC-CFR techniques. In some examples, the PLW is generated using window functions because a PLW is a comparatively smooth function with nonzero values for a finite duration.

Some W-CFR techniques generate a PLW by scaling a window function with scaling factors that are produced during peak detection. Such W-CFR techniques employ a Finite Impulse Response (FIR) filter to produce such scaling factors. In such techniques, the coefficients that form the FIR filter are populated by consecutive window function samples, and the input to the FIR filter is an Attenuation Indication Signal (AIS). An AIS consists of impulses marking peak locations, with the magnitude at each peak location corresponding to the overshoot level of the peak with respect to the target peak limit. A designer or manufacturer of such transmitter devices may implement the FIR filter with enough memory registers to store a buffer of AIS samples that span the duration of the window function. As a result, the value of the PLW at any point in time is a cumulative result of multiple previous peaks that are still influencing its value at said point in time. As used above and herein, the terms "scaling factor" and "weight" may be used interchangeably.

To store enough AIS samples to span the window function duration, the amount of memory needed to implement a FIR filter in W-CFR techniques is relatively high (e.g., enough memory to store approximately 1000 samples). Furthermore, a given type or shape of window waveform used in a W-CFR technique may be more effective in some use cases than others. Accordingly, the FIR filter used in such techniques are generally programmable so that the designer or manufacturer of the system level device that includes the transmitter (e.g., a mobile device, a vehicle, a cell tower, etc.) can choose the type or shape of window function that best fits their use case. The memory requirements and programmability described above increase both the power consumption of the FIR filter and the space dedicated on an integrated circuit (IC) to implementing the FIR filter.

When two peaks within the input signal occur near one another in time, a first window function corresponding to the first peak and produced by a FIR filter may overlap with a second window function corresponding to second peak and produced by the FIR filter. The overlap leads to generation of a PLW that causes excessive attenuation of the output signal that decreases signal quality (e.g., increases EVM as described above).

Some transmitter devices attempt to mitigate excess attenuation of the output signal by adding a feedback compensation path. The feedback compensation path enables the pre-compensation of the attenuation indicator signal for a new peak detected at any point in time. To do so, the feedback compensation path enables a transmitter device to account for the effects of multiple previous peaks that are still influencing the value of the PLW at said point in time. While the addition of such a feedback compensation increases the signal quality (e.g., decreases EVM) of the output signal, the feedback compensation requires an additional programmable FIR filter that consumes large amounts of space and power.

Example methods, apparatus, and systems described herein provide a transmitter device that can switch between PC-CFR techniques and W-CFR techniques responsive to the availability of frequency profile information. Example transmitter circuitry includes a shared set of compute resources (e.g., multipliers and memory registers) and uses the shared resources to implement either PC-CFR techniques or W-CFR techniques responsive to the operating mode. When generating a PLW while in W-CFR mode, the example transmitter circuitry computes a scaling factor for a current peak responsive to an overshoot factor of a current peak, sample values from half copy waveforms of previous peaks, and the scaling factors of previous peaks. The example transmitter circuitry then uses the scaling factor of the current peak and sample values from full copy waveforms of previous peaks to compute the overall PLW. As a result, the example transmitter circuitry can programmatically implement W-CFR without the power consumption or space required from previous W-CFR techniques using FIR filters. The example transmitter circuitry can also operate in systems regardless of whether the system provides frequency profile information, making the example transmitter circuitry applicable to a wider variety of use cases than other transmitter devices that rely solely on PC-CFR.

FIG. 1 is an example block diagram of a communication system. FIG. 1 includes an example network 100, an example network device 102, an example client device 104, and an example transmission medium 106. The network device 102 includes example controller circuitry 108, example transmitter circuitry 110, and example receiver circuitry 112. Similarly, the client device 104 includes example controller circuitry 118, example receiver circuitry 114, and example transmitter circuitry 116. FIG. 1 is an example of transmitter devices implemented within a telecommunication use case. More generally, transmitter devices implemented in the teachings described herein may be implemented in any type of use case or application.

The network 100 connects and facilitates communication between various endpoint devices to support Internet or telephone devices. In this example, the network 100 is a cellular network. However, the example network 100 may be implemented using any suitable wired or wireless network(s) including, for example, one or more data buses, one or more local area networks (LANs), one or more wireless LANs (WLANs), one or more coaxial cable networks, one or more satellite networks, one or more private networks, one or more public networks, etc. As used above and herein, the term "communicate" including variances (e.g., secure or non-secure communications, compressed or non-compressed communications, etc.) thereof, encompasses direct communication or indirect communication through one or more intermediary components and does not require direct physical (e.g., wired) communication or constant communication, but rather includes selective communication at periodic or aperiodic intervals, as well as one-time events.

The network device 102 may refer to any device that connects the client device 104 to other devices within the network 100. In FIG. 1, the network device 102 has a direct connection to the client device 104 via the transmission medium 106. In other examples, the network device 102 may indirectly communicate with the client device 104 by exchanging data across one or more intermediate devices. The network device 102 may operate using a wide variety of network communication protocols and perform a wide variety of cellular network operations. For example, the network device 102 may be implemented as one or more of a base station, a cell tower, a signal repeater, a macro remote radio unit (RRU), a Multiple-Input and Multiple-Output (MIMO) antenna system, a distributed antenna system (DAS), etc. Accordingly, the network device 102 does provide frequency profile information in some examples and does not provide frequency profile information in other examples.

The client device 104 refers to any endpoint device capable of connecting to the network 100. Accordingly, the client device 104 may form requests for data responsive to inputs from a user and transmit the requests over the network 100. Example devices that may implement the client device 104 may include but are not limited to a cell phone, a smart vehicle, a wearable device, etc.

In FIG. 1, the network device 102 and client device 104 communicate with one another using a cellular network protocol (e.g., 3G, 4G LTE, 5G, etc.). In other examples, the network device 102 and client device 104 may use a different wireless or wired communication protocol, including but not limited to Universal Serial Bus (USB), Ethernet, Wireless Fidelity (Wi-Fi)®, Bluetooth®, Near Field Communication (NFC), Orthogonal Frequency-Division Multiplexing (OFDM), Code-Division Multiple Access (CDMA), etc. In some examples, the type of communication protocol used between the network device 102 and client device 104 is based in part on whether the transmission medium 106 is a wired or wireless medium.

The controller circuitry 108 receives data from a source (e.g., an internal memory, the client device 104, etc.) and performs operations responsive to the data. For example, the controller circuitry 108 generates a digital input signal x(n) to be provided to the client device 104. The controller circuitry 108 also determines whether the transmitter circuitry 110 performs PC-CFR operations or W-CFR as described in the teachings herein. Similarly, the controller circuitry 118 receives data from a source and performs operations responsive to the data. The controller circuitry 108 and 118 may be implemented by any type of programmable circuitry. Examples of programmable circuitry include programmable microprocessors, Field Programmable Gate Arrays (FPGAs) that may instantiate instructions, Central Processor Units (CPUs), Graphics Processor Units (GPUs), Digital Signal Processors (DSPs), or microcontrollers and integrated circuits (ICs) such as Application Specific Integrated Circuits (ASICs).

The transmitter circuitry 110 and the transmitter circuitry 116 receive digital signals from the controller circuitry 108 and the controller circuitry 118, respectively. The transmitter circuitry 110 and 116 both perform signal processing operations that include CFR as described in the teachings herein. Accordingly, the example transmitter circuitry 110 and transmitter circuitry 116 can be implemented within the network device 102 and client device 104, respectively, at less cost and size than other transmitter devices. The transmitter circuitry 110 is described further in connection with FIG. 2.

The receiver circuitry 112 receives the analog signal transmitted by the transmitter circuitry 116, converts the analog signal into a digital signal, and provides the digital signal to the controller circuitry 108. Similarly, the receiver circuitry 114 receives the analog signal transmitted by the transmitter circuitry 110, converts the analog signal into a digital signal, and provides the digital signal to the controller circuitry 118.

Figure 2:
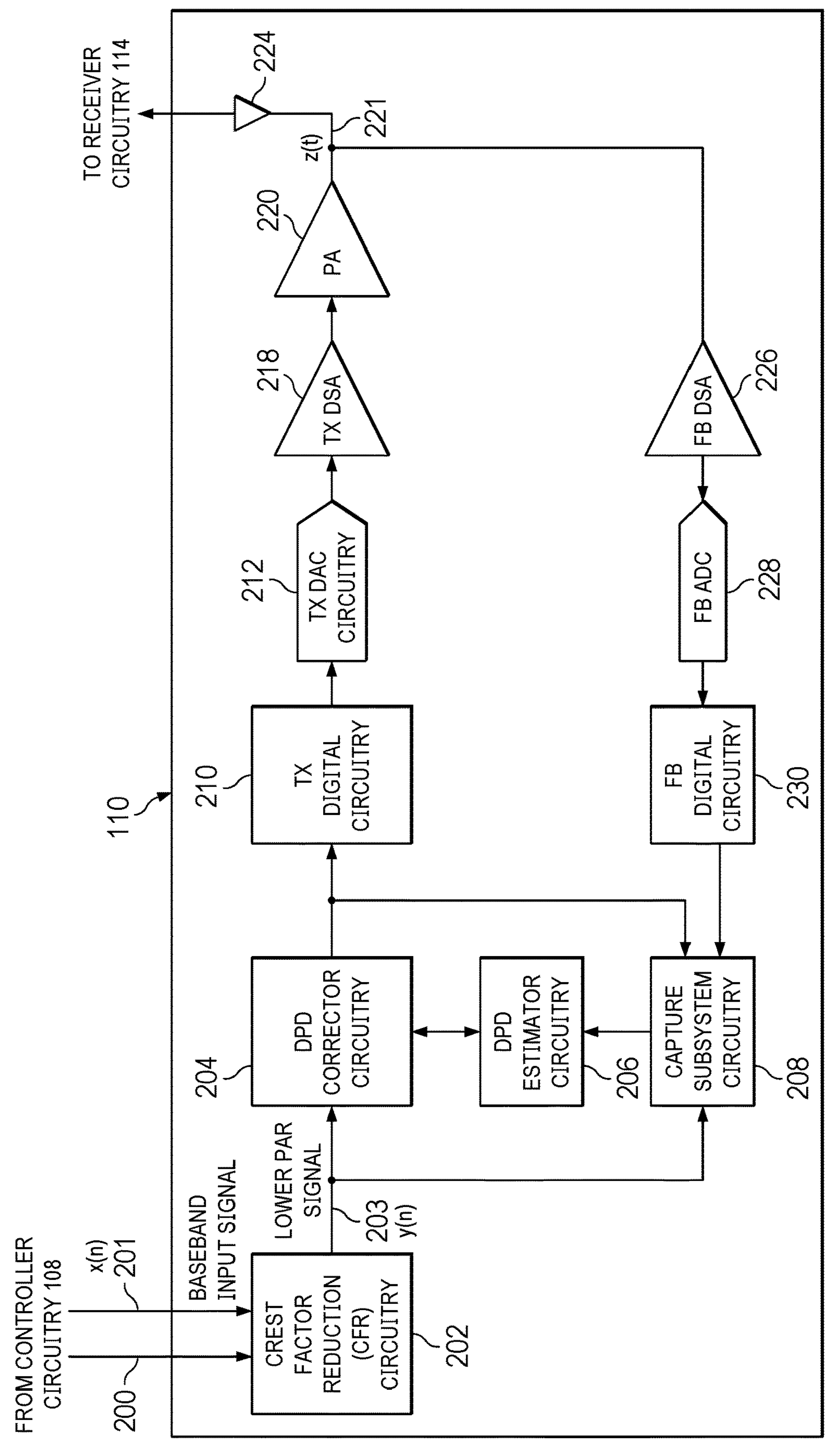
FIG. 2 is a block diagram of an example implementation of the transmitter circuitry of FIG. 1.

FIG. 2 is a block diagram of an example implementation of the transmitter circuitry of FIG. 1. The transmitter circuitry 110 includes example CFR circuitry 202, example digital pre-distortion (DPD) corrector circuitry 204, example DPD estimator circuitry 206, example capture subsystem circuitry 208, example transmitter (TX) digital circuitry 210, example TX Digital to Analog Converter (DAC) circuitry 212, example TX digital step attenuator (DSA) circuitry 218, example power amplifier (PA) circuitry 220, an example antenna 224, an example feedback (FB) DSA 226, example FB Analog to Digital Circuitry (ADC) 228, example FB digital circuitry 230. FIG. 2 also includes an example mode selection signal 200, an example input signal 201 (referred to herein as x(n) 201), and an example modified signal 203 (which may be referred to herein as y(n) 203), an example output signal 221 (which may be referred to herein as z(t) 221).

The mode selection signal 200 is a signal produced by the controller circuitry 108 that indicates whether the CFR circuitry 202 is to use PC-CFR or W-CFR techniques. In some examples, the mode selection signal 200 is a predetermined value responsive to the availability of frequency profile information as described above.

The CFR circuitry 202 reduces and removes peaks within x(n) 201 to produce a modified signal, y(n) 203, that has a lower PAR than x(n) 201. By reducing and removing peaks, y(n) 203 may have fewer envelope excursions that violate a target peak limit than x(n) 201. The peak limit violations that remain in y(n) 203 may also have smaller magnitudes than those of x(n) 201. The example CFR circuitry 202 produces y(n) 203 by performing either PC-CFR operations or W-CFR operations without a FIR filter as described in the teachings herein. The CFR circuitry 202 determines which CFR technique to use responsive to the mode selection signal 200. The CFR circuitry 202 is described further in connection with FIG. 3. In some examples, the CFR circuitry 202 is instantiated by programmable circuitry executing CFR instructions or configured to perform operations such as those represented by the flowchart(s) of FIGS. 9 and 10.

The DPD corrector circuitry 204 pre-distorts y(n) 203 to counteract distortion that occurs when the signal is transmitted using the PA circuitry 220 over the transmission medium 106. The DPD corrector circuitry 204 forms a pre-distorted version of y(n) 203 using various configuration parameters. The values of the configuration parameters are updated by the DPD estimator circuitry 206 responsive to the output of the capture subsystem circuitry 208. The capture subsystem circuitry 208 samples y(n) 203, the output of the DPD corrector circuitry, and z(t) 221 (e.g., the output of the PA circuitry 220) to aid in the determination of how y(n) 203 will be pre-distorted. One or more of the DPD corrector circuitry 204, the DPD estimator circuitry 206, or the capture subsystem circuitry 208 may be implemented by any type of programmable circuitry. In some examples, the DPD corrector circuitry 204 is instantiated by programmable circuitry executing DPD corrector instructions or configured to perform operations such as those represented by the flowchart(s) of FIGS. 9 and 10.

The TX digital circuitry 210 interpolates the output of the DPD corrector circuitry 204 to introduce additional data points. The additional data points increase the sample rate of the modified signal relative to the sample rate of the original input signal x(n) 201 for effective digital to analog conversion using the TX DAC circuitry 212.

The example TX DAC circuitry 212 converts the output of the TX digital circuitry 210 from a digital signal to an analog signal. As a result, information transmitted across the transmission medium 106 is encoded continuously across a range of voltages rather than a discrete set of voltages.

The example TX DSA circuitry 218 attenuates the foregoing analog signal in order to compensate for gain variations in the PA circuitry 220. The TX DSA circuitry 218 performs the attenuation responsive to the gain of the PA circuitry 220, which may change responsive to temperature. The PA circuitry 220 then amplifies the interpolated and attenuated signal to produce z(t) 221, which is transmitted across the transmission medium 106 via the antenna 224. The amplification of the PA circuitry 220 introduces non-linearity that is counteracted by the pre-distortion of the DPD corrector circuitry 204. In some examples, the PA circuitry 220 is instantiated by programmable circuitry executing PA instructions or configured to perform operations such as those represented by the flowchart(s) of FIGS. 9 and 10.

The FB DSA circuitry 226 receives the analog signal z(t) 221 from the PA circuitry 220 and attenuates the signal. In some examples, the FB DSA circuitry 226 attenuates the z(t)221 responsive to the operating parameters of the FB ADC circuitry 228.

The FB ADC circuitry 228 converts the attenuated version of z(t) 221 from an analog signal back to a digital signal. The FB digital circuitry 230 then reduces the sampling rate of the digital signal. The resulting signal is obtained by the capture subsystem circuitry 208 for interpretation by the DPD estimator circuitry 206 and the controller circuitry 108.

Figure 3:
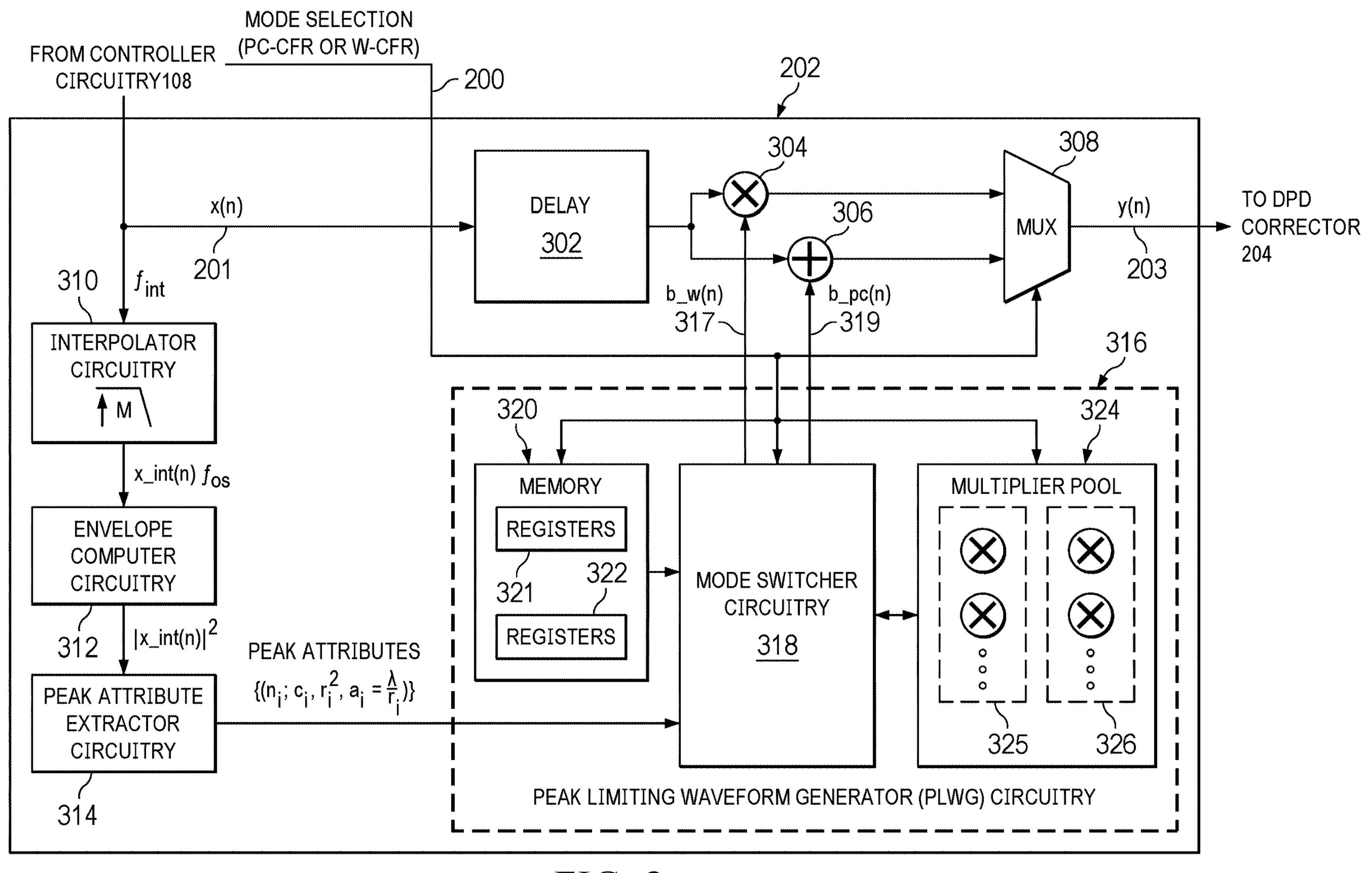
FIG. 3 is a block diagram of an example implementation of the Crest Factor Reduction (CFR) circuitry of FIG. 2.

FIG. 3 is a block diagram of an example implementation of the Crest Factor Reduction (CFR) circuitry 202 of FIG. 2 to generate a modified signal y(n) 203 with lower PAR than the original input signal x(n) 201. The CFR circuitry 202 includes example delay circuitry 302, an example multiplier 304, an example adder 306, an example multiplexer 308 (which may be herein after referred to as mux 308), example interpolator circuitry 310, example envelope computer circuitry 312, example peak attribute extractor circuitry 314, and example Peak Limiting Waveform Generator (PLWG) circuitry 316. The PLWG circuitry 316 includes example mode switcher circuitry 318, example memory 320, and an example multiplier pool 324. The memory 320 includes example registers 321 and 322. The multiplier pool 324 includes example multipliers 325 and example multipliers 326. FIG. 3 also includes an example PLW signal 317 (which may be referred to herein as $b_w$(n) 317) and an example cancellation signal 319 (which may be referred to herein as $b_{pc}$(n) 319). In some examples, the multiplier 304 or the adder 306 may be either individually or collectively referred to as arithmetic circuitry.

The example delay circuitry 302 outputs a delayed copy of the original input signal x(n) 201. For example, the delay circuitry 302 may receive sample n=0 from x(n) 201 (e.g., receive x(0)) at TO and output said sample at T1. The amount of time between the output and input of the delay circuitry 302 (e.g., the difference between T0 and T1) is set such that the multiplier 304 and the adder 306 receive inputs with matching sample indices. For example, the multiplier 304 may receive x(0) and $b_w$(0) at T1, receive x(1) and $b_w$(1) at T2, or more generally, receive x(n) and $b_w$(n) 317 at any time, where n is any integer. Similarly, the adder 306 receives x(n) and $b_{pc}$(n) 319 at any time, where n is any integer. As such, the magnitude of the delay produced by the delay circuitry 302 is responsive to the amount of time require for the interpolator circuitry 310, the envelope computer circuitry 312, the peak attribute extractor circuitry 314, and the PLWG circuitry 316 to perform operations.

The multiplier 304 multiplies together samples from the delayed version of x(n) 201 with samples from $b_w$(n) 317 that correspond to one another in time. Similarly, the adder 306 adds together samples from the delayed version of x(n) 201 with samples from $b_{pc}$(n) 319 that correspond to one another in time. Both $b_w$(n) 317 and $b_{pc}$(n) 319 are produced by the mode switcher circuitry 318 and are described further below.

The mux 308 obtains a signal formed by products from the multiplier 304 and a signal formed by sums from the adder 306. The mux 308 outputs one of the two input signals to form the modified signal y(n) 203. The mux 308 determines which input will form y(n) 203 responsive to the mode selection signal 200. If the mode selection signal 200 indicates that W-CFR techniques are to be used, then the mux 308 forms y(n) 203 using the output of the multiplier 304. Alternatively, if the mode selection signal 200 indicates that PC-CFR techniques is to be used, then the mux 308 forms y(n) 203 using the output of the adder 306.

The mode selection signal 200 is a statically configured value based on the particular use case (e.g., whether frequency profile information is present as described above). Accordingly, in some examples, a designer or manufacturer of the network device 102 can configure a particular instance of the CFR circuitry 202 to only perform the required operation (e.g., use the adder 306 when frequency profile information is present and use the multiplier 304 when frequency profile information is not present), thereby saving power.

The original input signal x(n) 201 is a digital signal formed by discrete samples. In some examples, the sampling frequency of the discrete samples in x(n) is sufficiently low such that when the TX Digital Circuitry 210 interpolates the samples and/or the TX DAC circuitry 212 converts the signal to analog, a peak is formed between two of the discrete samples. Accordingly, the interpolator circuitry 310 adds new data points in between the existing data points of x(n) 201 (e.g., interpolates x(n) 201) so that any peaks that may be realized at an increased sampling rate or in an analog signal can be detected and mitigated. The interpolator circuitry 310 may use any suitable interpolation technique, including but not limited to linear interpolation, polynomial interpolation, nearest neighbor interpolation, etc. In some examples, the output of the interpolator circuitry 310 may have twice or four times as many samples as x(n) 201. In other examples, the interpolator circuitry 310 produces an output with a different number of data points. The output of the interpolator circuitry 310 may be referred to herein as $x_{int}(n)$.

The envelope computer circuitry 312 produces an envelope of $x_{int}(n)$. In general, CFR techniques operate by identifying locations in the (potentially interpolated) input signal where the envelope value at those locations violates a pre-specified threshold value (which may be referred to as the peak limit). CFR techniques also select appropriate local maxima in the envelope signal as "peaks" that need to be addressed for crest factor reduction. The output of the envelope computer circuitry 312 may be referred to as $|x_{int}(n)|^2$.

The peak attribute extractor circuitry 314 identifies peak locations in the input envelope and determines attributes of the envelope signal $|x_{int}(n)|^2$ at identified peak locations. The attributes determined by the peak attribute extractor circuitry 314 may include but are not limited to: $\{n_i, c_i, r_i^2, a_i\}$. Here, $n_i$ refers to the sample index, n, of the i-th peak within the envelope signal. $c_i$ refers to a complex sample of the i-th peak. The peak attribute extractor circuitry 314 outputs $c_i$ in response to the mode selector signal 200 indicating PC-CFR techniques is employed. $c_i$ is described further in connection with FIG. 8. $r_i^2$ refers to the squared magnitude of the i-th peak in the envelop signal. $a_i$ refers to a desired attenuation factor of the i-th peak. The desired attenuation factor $a_i$ quantifies the reduced amplitude of the signal output by the CFR circuitry 202. The value of $a_i$ is given by $(\lambda/r_i)$, where X is a threshold value that describes the maximum desired amplitude of y(n) 203 and $r_i$ is the amplitude of the i-th peak. In some examples, the peak attribute extractor circuitry 314 produces other attributes in addition to or replacement of $\{n_i, c_i, r_i^2, a_i\}$.

Within the PLWG circuitry 316, the mode switcher circuitry 318 uses one or more of $\{n_i, c_i, r_i^2, a_i\}$ to compute either $b_{pc}(n)$ 319 or $b_w(n)$ 317 as described in the teachings herein. If the mode selection signal 200 indicates PC-CFR techniques are used, the mode switcher circuitry 318 uses $\{n_i, c_i, r_i^2\}$, and a PCW stored in the memory 320, to form $b_{pc}(n)$ 319. Alternatively, if the mode selection signal 200 indicates that W-CFR techniques are used, the mode switcher circuitry 318 uses $\{n_i, a_i\}$, and windowing function samples from the memory 320, to form $b_w(n)$ 317 as described in the teachings herein. The mode switcher circuitry 318 may be implemented by any type of programmable circuitry and is described further in connection with FIG. 4.

Within the memory 320, the registers 321 and 322 refer to different sets of addresses. The memory 320 includes two terminals (e.g., communication interfaces, ports, pins, etc.) such that the registers 321 and 322 can be accessed in parallel by the mode switcher circuitry 318. The PLWG circuitry 316 stores different types of data in the registers 321 and 322 responsive to the mode selection signal 200. If the mode selection signal 200 indicates PC-CFR techniques are used, the registers 321 and 322 store the real and imaginary components of the complex valued PCW samples as described in connection with FIG. 8. In some examples, the real and imaginary components of the PCW are referred to as I samples and Q samples, respectively. If instead the mode selection signal 200 indicates W-CFR techniques are used, the registers 321 and 322 store full copies and half copies of a normalized real-valued windowing function. The foregoing full copies and half copies are described further in connection with FIGS. 5A and 6A respectively.

The multiplier pool 324 refers to a collection of multiplier circuits that are used by the mode switcher circuitry 318 to produce $b_w(n)$ 317 or $b_{pc}(n)$ 319. If the mode selection signal 200 indicates PC-CFR techniques are used, some or all of the multiplier pool 324 are used to compute a phasor (a complex scale factor) to scale and rotate the PCW components to create the cancelling pulse as further described in connection with FIG. 8. If instead the mode selection signal 200 indicates W-CFR techniques are used, the mode switcher circuitry 318 uses the multipliers 325 (a first subset of the multiplier pool 324) to compute a scaling factor of the i-th peak. The mode switcher circuitry 318 simultaneously uses the multipliers 326 (a second subset of the multiplier pool 324) to compute PLW samples that collectively form $b_w(n)$ 317. The multipliers 325 and 326 are described further in connection with FIGS. 5B, 6B, and 8.

The memory 320 and multiplier pool 324 are both examples of compute resources that are shared across PC-CFR operations and W-CFR operations. Such resource sharing enables the CFR circuitry 202 to perform either PC-CFR operations and W-CFR operations responsive to the availability of frequency profile information as described above, and to be implemented at less size and cost than a hypothetical device that supports PC-CFR and W-CFR as two independent sub-systems (e.g., as two separate entities within a transmitter device).

Figure 4:
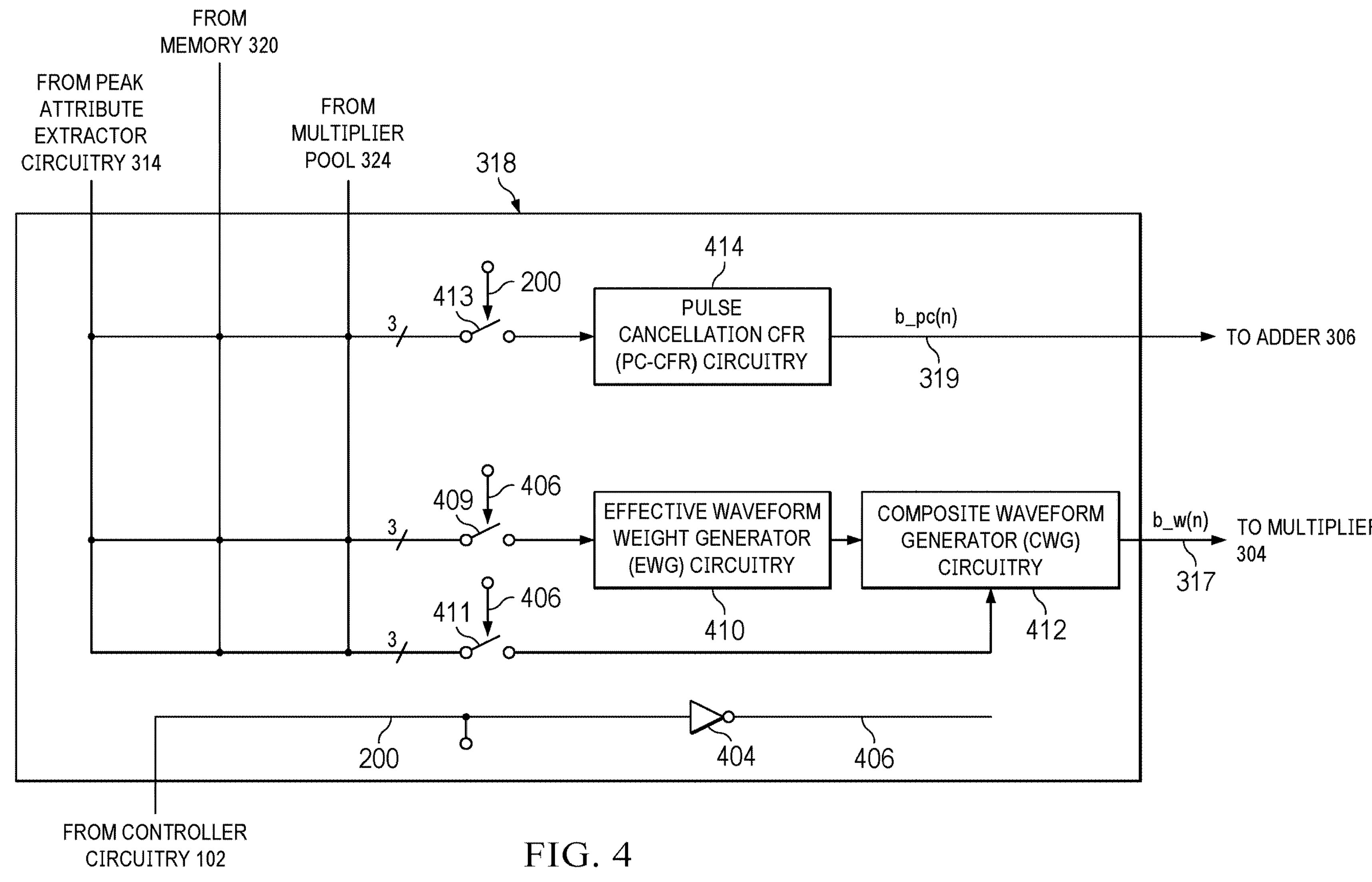
FIG. 4 is a block diagram of an example implementation of the mode switcher circuitry of FIG. 3.

FIG. 4 is a block diagram of an example implementation of the mode switcher circuitry 318 of FIG. 3 to produce either PLW samples that form $b_w(n)$ 317 or cancelling pulse samples that form $b_{pc}(n)$ 319. The mode switcher circuitry 318 may be instantiated (e.g., creating an instance of, bring into being for any length of time, materialize, implement, etc.) by programmable circuitry such as a Central Processor Unit (CPU) executing first instructions. Furthermore, the mode switcher circuitry 318 of FIG. 3 may be instantiated (e.g., creating an instance of, bring into being for any length of time, materialize, implement, etc.) by (i) an Application Specific Integrated Circuit (ASIC) or (ii) a Field Programmable Gate Array (FPGA) structured or configured in response to execution of second instructions to perform operations corresponding to the first instructions. Some or all of the circuitry of FIG. 4 may, thus, be instantiated at the same or different times. Some or all of the circuitry of FIG. 4 may be instantiated, for example, in one or more threads executing concurrently on hardware or in series on hardware. Moreover, in some examples, some or all of the circuitry of FIG. 4 may be implemented by microprocessor circuitry executing instructions or FPGA circuitry performing operations to implement one or more virtual machines or containers. FIG. 4 shows that the mode switcher circuitry 318 includes the mode selection signal 200 of FIG. 2, an example inverter 404, an example switch signal 406, switches 409, 411, and 413, example Effective Weight Generator (EWG) circuitry 410, example Composite Waveform Generator (CWG) circuitry 412, and example PC-CFR circuitry 414. In some examples, the EWG circuitry and CWG circuitry 412 are collectively referred to as W-CFR circuitry.

In the example of FIG. 4, the mode selection signal 200 is represented as a binary signal such that a logical '1' represents PC-CFR and a logical '0' represents W-CFR, or vice-versa. In other examples, the mode selection signal 200 is implemented through a different technique that indicates status (e.g., an interrupt, setting a bit flag in a register, etc.). The inverter 404 receives the mode selection signal 200 and produces the switch signal 406. As such, the switch signal 406 and mode selection signal 200 are inverted binary signals (e.g., one signal is a logical '1' whenever the other signal is a logical '0', and vice-versa).

The mode selection signal 200 is used to open or close the switch 413, while the switch signal is used to open and close both switch 409 and switch 411. Therefore, at any point in time, either: a) switches 409 and 411 are closed while switch 413 is open, or b) switches 409 and 411 are open while switch 411 is closed.

When the mode selection signal 200 and switch signal 406 indicate W-CFR techniques are used, the switches 409 and 411 are closed. In such examples, the EWG circuitry 410 obtains one more parameters from the peak attribute extractor circuitry 314, values from portions of the memory 320, and access to the multiplier pool 324. The EWG circuitry 410 uses the resources to produce scaling factors as described in the teachings herein. A given scaling factor, $d_i$, quantifies the amount that a window function is to be scaled up or down to account for the i-th peak within $|x_{int}(n)|^2$. The EWG circuitry 410 is described further in connection with FIG. 5B.

When enabled by the switch signal 406, the CWG circuitry 412 uses the scaling factors produced by the EWG circuitry 410, parameters from the peak attribute extractor circuitry 314, and portions of the memory 320 and multiplier pool 324, to produce $b_w(n)$ 317 as described in the teachings herein. The EWG circuitry 410 is described further in connection with FIG. 5B.

When the mode selection signal 200 and switch signal 406 indicate PC-CFR techniques are used, the switch 413 is closed. In such examples, the PC-CFR circuitry 414 obtains one or more parameters from the peak attribute extractor circuitry 314, PCW samples from the memory 320, and access to portions of the multiplier pool 324 to produce $b_{pc}(n)$ 319. The PC-CFR circuitry 414 is described further in connection with FIG. 5B.

In the example of FIG. 4, the switches 409, 411, and 413 are used to configure the mode switcher circuitry 318 to perform either PC-CFR techniques or W-CFR techniques responsive to the mode selection signal 200, which is a static value determined based on the use case of the network device 102. In other examples, a different technique (e.g., a different configuration of switches, an implementation without switches, etc.) is used to configure the mode switcher circuitry 318 to perform either PC-CFR techniques or W-CFR techniques responsive to the mode selection signal 200.

Figure 5A:
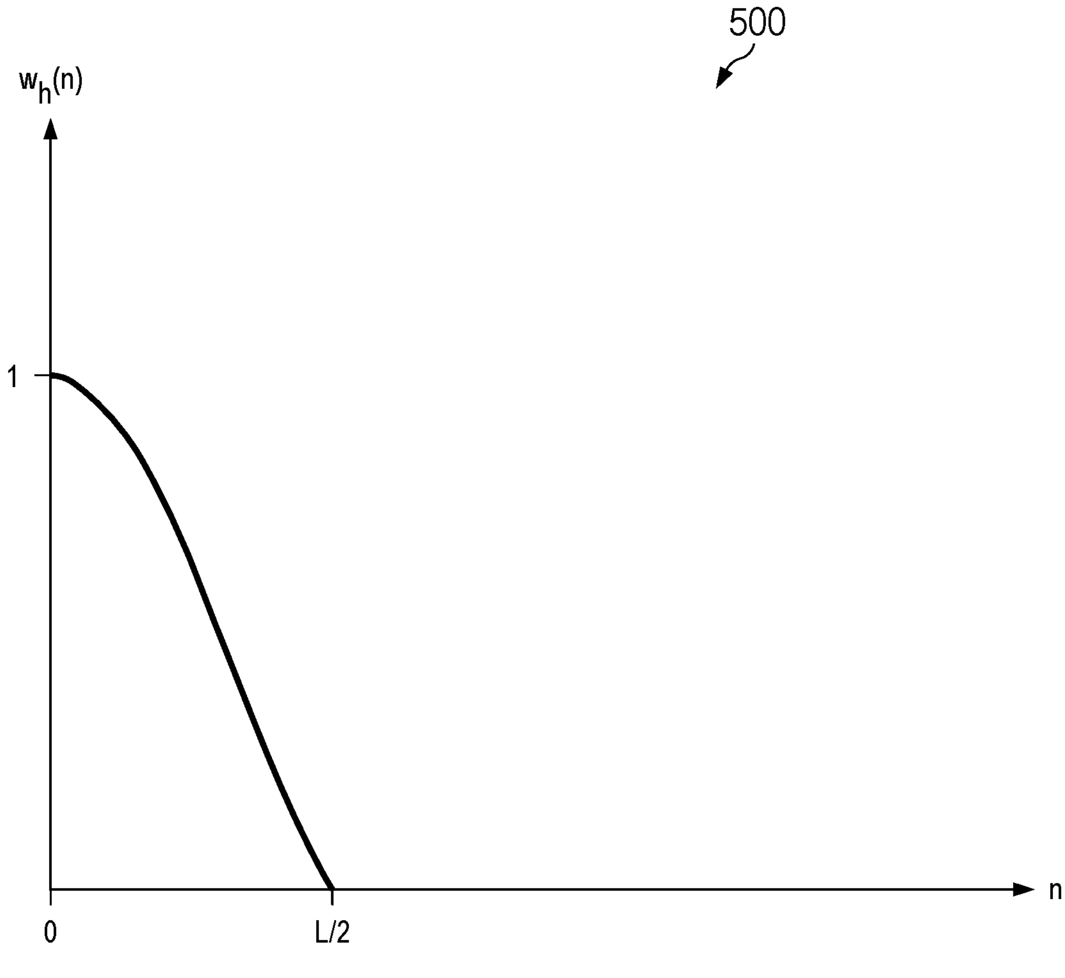
FIG. 5A is a graph of an illustrative example of a half copy of a normalized window function.

FIG. 5A is an example graph 500 of a half copy of a normalized window function (which may be referred to above and herein as $w_h(n)$ 500). A window function w(n) is a standardized shape that, after being scaled and combined appropriately by the EWG circuitry 410 and CWG circuitry 412, will form $b_w(n)$ 317 and can be used to attenuate the peaks of x(n) 201. In examples described herein, w(n) is a windowing function. Examples of a windowing function include but are not limited to a Hann window, a Hamming window, a Blackman-Harris window, etc. In other examples, w(n) is a different standardized shape.

The PLWG circuitry 316 scales and combines copies of the window function together with the presumption that the width of a given copy of the window function is centered in time on a particular peak. Therefore, the EWG circuitry 410 uses $w_h(n)$ 500, which represents only half of the standardized window shape, because the scaling factors $d_i$ produced by the EWG circuitry 410 can only be determined responsive to previous peaks and not by future peaks. FIG. 5A shows $w_h(n)$ 500 is half of the standardized window shape by indicating there are L/2+1 nonzero samples present, where L+1 is the number of nonzero samples in w(n). The use of $w_h(n)$ 500 by the EWG circuitry 410 is described further in FIG. 5B.

Figure 5B:
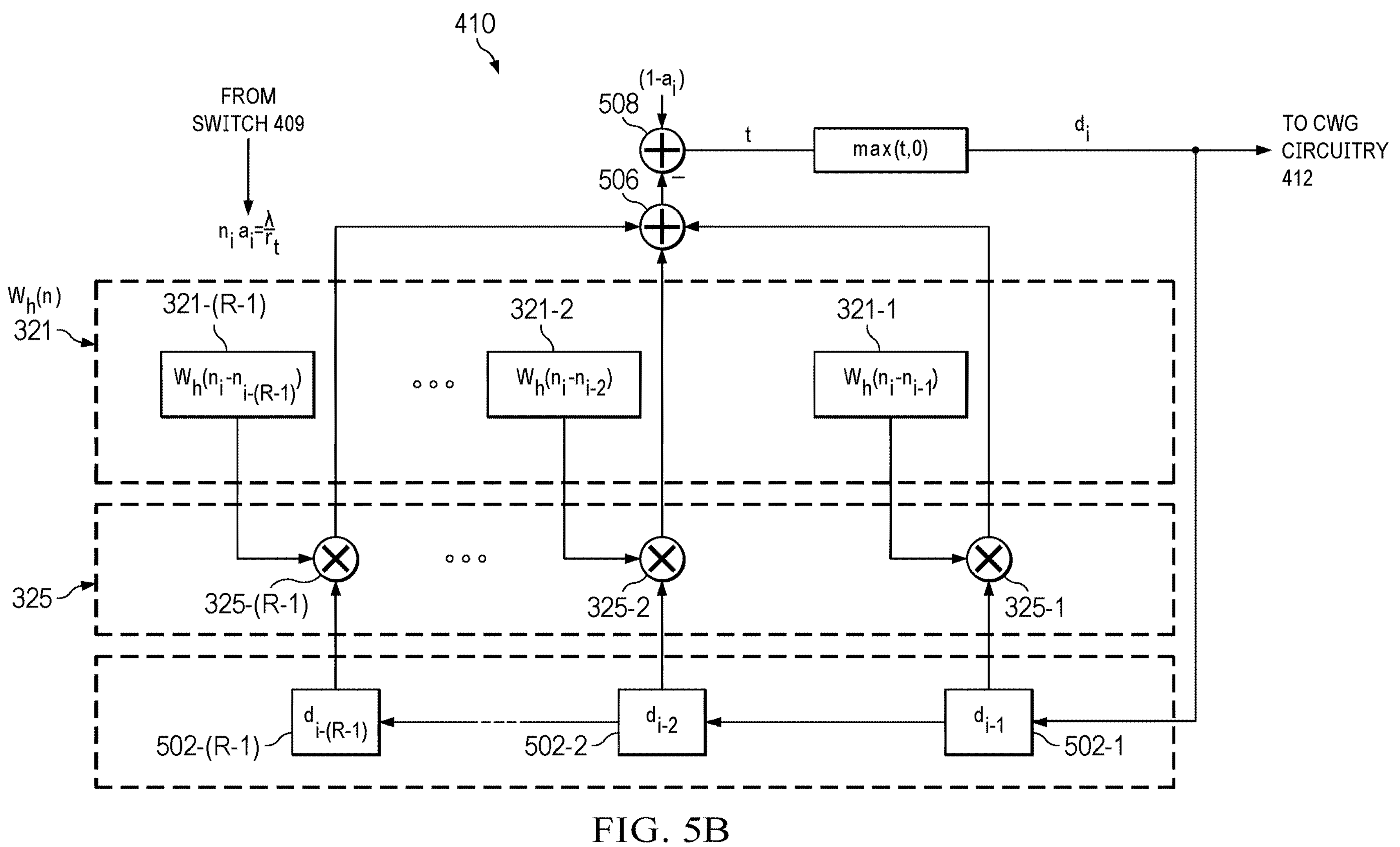
FIG. 5B is a block diagram of an example implementation of the effective waveform weight generation (EWG) circuitry of FIG. 4 using the waveform of FIG. 5A.

FIG. 5B is a block diagram of an example implementation of the effective waveform weight generation (EWG) circuitry of FIG. 4. FIG. 5B includes the register 321 and the multipliers 325 of FIG. 3. The register 321 includes individual indices 321-1, 321-2 . . . , and 321-(R−1). Similarly, the multipliers 325 includes individual multipliers 325-1, 325-2, . . . , and 325-(R−1). FIG. 5B also includes an example tap delay line 502, which is composed of indices 502-1, 502-2, . . . , 502-(R−1), and example adders 506 and 508.

The EWG circuitry 410 produces scaling factors $d_i$, which represent the relative magnitude of a given (e.g., the i-th) peak. In some examples, $d_i$ is referred to as weights. The EWG circuitry 410 does not run continuously, but instead produces a weight value in response to the circuit being triggered. The circuit is triggered by the detection of a peak in $|x_{int}(n)|^2$, which the peak attribute extractor circuitry 314 indicates by appropriate change in the value of $n_i$. For example, the values of $n_i$ may indicate a first peak is at sample n=0 of $|x_{int}(n)|^2$, a second peak is at n=50, etc.

When the values of $n_i$ received at the switch 409 indicate than an i-th peak is detected, the most recently calculated weight, $d_{i-1}$, is stored at index 502-1, the second most previous weight, $d_{i-2}$, is moves to index 502-1, . . . , the second-oldest weight, $d_{i-(R-1)}$, moves to index 502-R, and the oldest value, $d_{i-R}$, is removed. As such, the tap delay line 502 may be referred to as a First In First Out (FIFO) buffer that stores the weights of the previous R−1 peaks. The R−1 weights allow the value of $b_w(n)$ 317 at any given sample to counteract the effects of R−1 many previous peaks within x(n) 201. In some examples, the value of R is between approximately eight and twelve. In other examples, the value of R is a different number.

The register 321 stores samples of $w_h(n)$ 500 as described above. In addition to updating the tap delay line 502, the detection of a peak also changes which samples of $w_h(n)$ 500 (e.g., which particular indices of register 321) are used as inputs by the multipliers 325. For example, when calculating the weight d for the i-th peak, the multiplier 325-1 uses the index 321-1 to obtain sample $w_h[n_i-n_{i-1}]$, which is a sample whose index is given by the difference between the current peak index ($n_i$) and the first previous peak index ($n_{i-1}$). Similarly, the multiplier 325-2 uses index 321-2 to obtain $w_h[n_i-n_{i-2}]$, which is a sample whose index is given by the difference between the index of the current peak ($n_i$) and the index of the second previous peak index ($n_{i-2}$). In total, the samples of $w_h(n)$ 500 obtained by the multipliers 325 are representative of the last R−1 peak indices with respect to the current peak index.

When the EWG circuitry 410 is triggered, the multiplier 325-1 multiplies the half copy waveform sample that corresponds to the first previous peak, $w_h[n_i-n_{i-1}]$, with the weight of the first previous peak $d_{i-1}$. The resulting product is a value that represents how much the current peak (e.g., the i-th peak) will be attenuated due to the proximity of the first previous peak (e.g., the (i−1)th peak) affecting the magnitude of the current peak. Similarly, the other multipliers 325 generate products that represent how much the current peak will be attenuated due to the proximity of the last R−1 previous peaks.

The adder 506 adds the products produced by the multipliers 325 to one another. The term ($1-a_i$) represents the overshoot factor of the i-th peak (e.g., the amount that the i-th peak has exceeded a desired maximum amplitude of y(n) 203) and is responsive to the attenuation factor ($a_i$) produced by the peak attribute extractor circuitry 314. Finally, the adder 508 subtracts the sum of adder 506 from ($1-a_i$) and replaces any negative values with zero (denoted algebraically in FIG. 5B as max(t, 0)), to produce the effective weight/scaling factor ($d_i$). The computations of adders 506 and 508 effectively discount the continuing influence of the prior peaks at the current peak location in determining the weight for the current peak.

Other approaches to W-CFR compute $d_i$ by sampling an always-running FIR filter at a particular point in time that corresponds to a peak in $|x_{int}(n)|^2$. However, the continued use of an FIR filter requires a large amount of space and consumes a large amount of power as described above. In contrast, the EWG circuitry 410 only produces an output when a new peak is detected by the peak attribute extractor circuitry 314. Furthermore, the EWG circuitry 410 uses a fixed number of compute resources: R−1 indices of memory in the tap delay line 502, R−1 multipliers from the multipliers 325, and R−1 indices of memory from the register 321, where R can be any integer but may generally be implemented between eight and twelve. In contrast, FIR filters may use thousands of memory indices and multipliers as described above. Accordingly, the EWG circuitry 410 produces peak scaling factors using less compute resources and consuming less power than other approaches that rely on an FIR filter.

In the example described above, the EWG circuitry 410 moves the appropriate values of $w_h(n)$ 500 into a particular set of indices (325-1, 325-2 . . . , 325-(R−1)) when triggered by the detection of a new peak. Accordingly, the multipliers 325 repeatedly selects inputs from the same set of indices in FIG. 5B. In other examples, values do not move between indices. Rather, when a peak is detected, the EWG circuitry 410 causes the multiplier to access a different value from a different index.

Figure 6A:
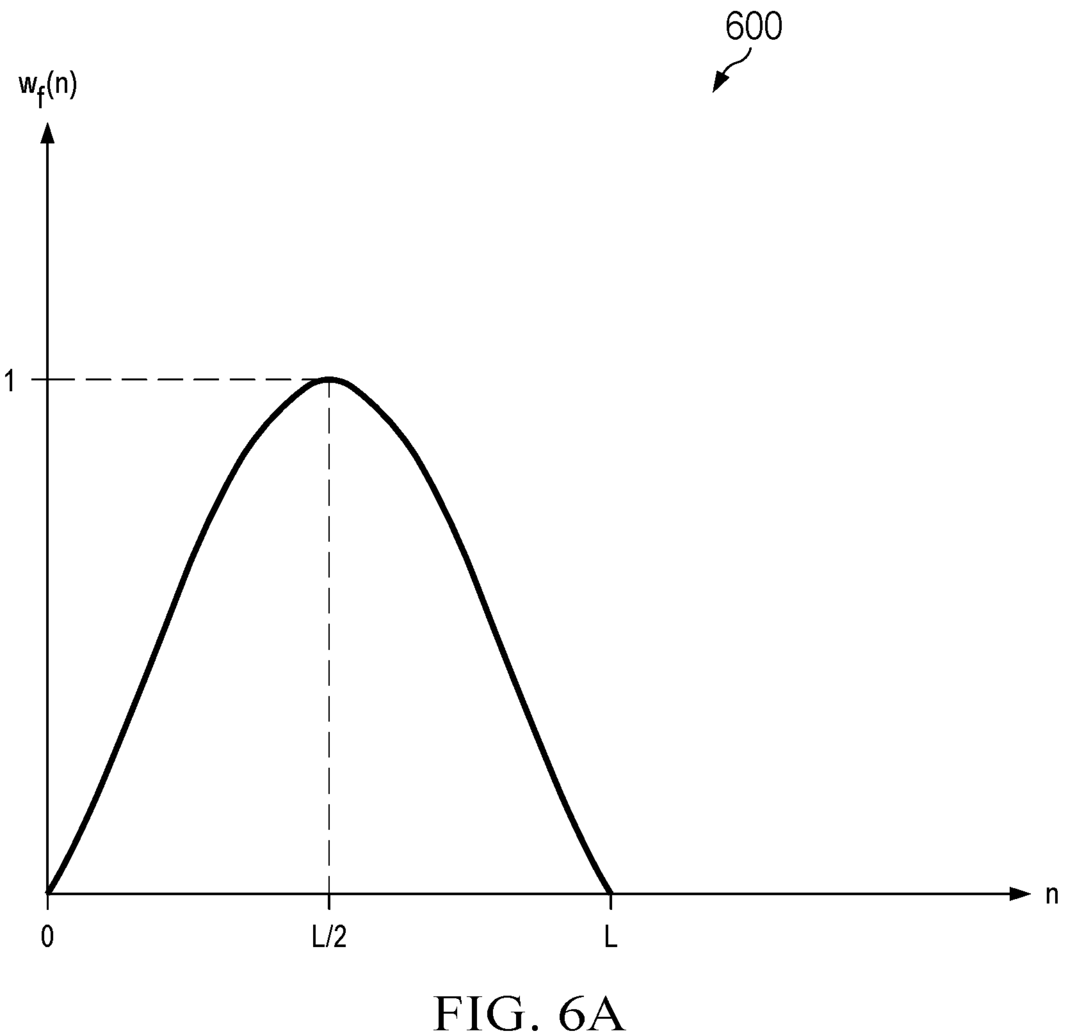
FIG. 6A is a graph of an illustrative example of a full copy of a normalized window function.

FIG. 6A is an example graph 600 of a full copy of a normalized window function (which may be referred to herein as $w_f(n)$ 600). Before any scaling occurs, FIG. 6A shows that $w_f(n)$ 600 evaluates to 0 at n=0, evaluates to 1 at n=L/2, and evaluates to 0 at n=L. Accordingly, $w_f(n)$ 600 is a time shifted copy of the normalized window function w(n) described above in connection with FIG. 5A. The CWG circuitry 412 uses $w_f(n)$ 600 rather than $w_h(n)$ 500 so that $b_w(n)$ 317 attenuates not only the specific sample index $n_i$ that corresponds to a peak, but also attenuates the adjacent indices before and after the peak that are influenced by the peak neighborhood. The use of $w_f(n)$ 600 by the CWG circuitry 412 is described further in FIG. 6B.

Figure 6B:
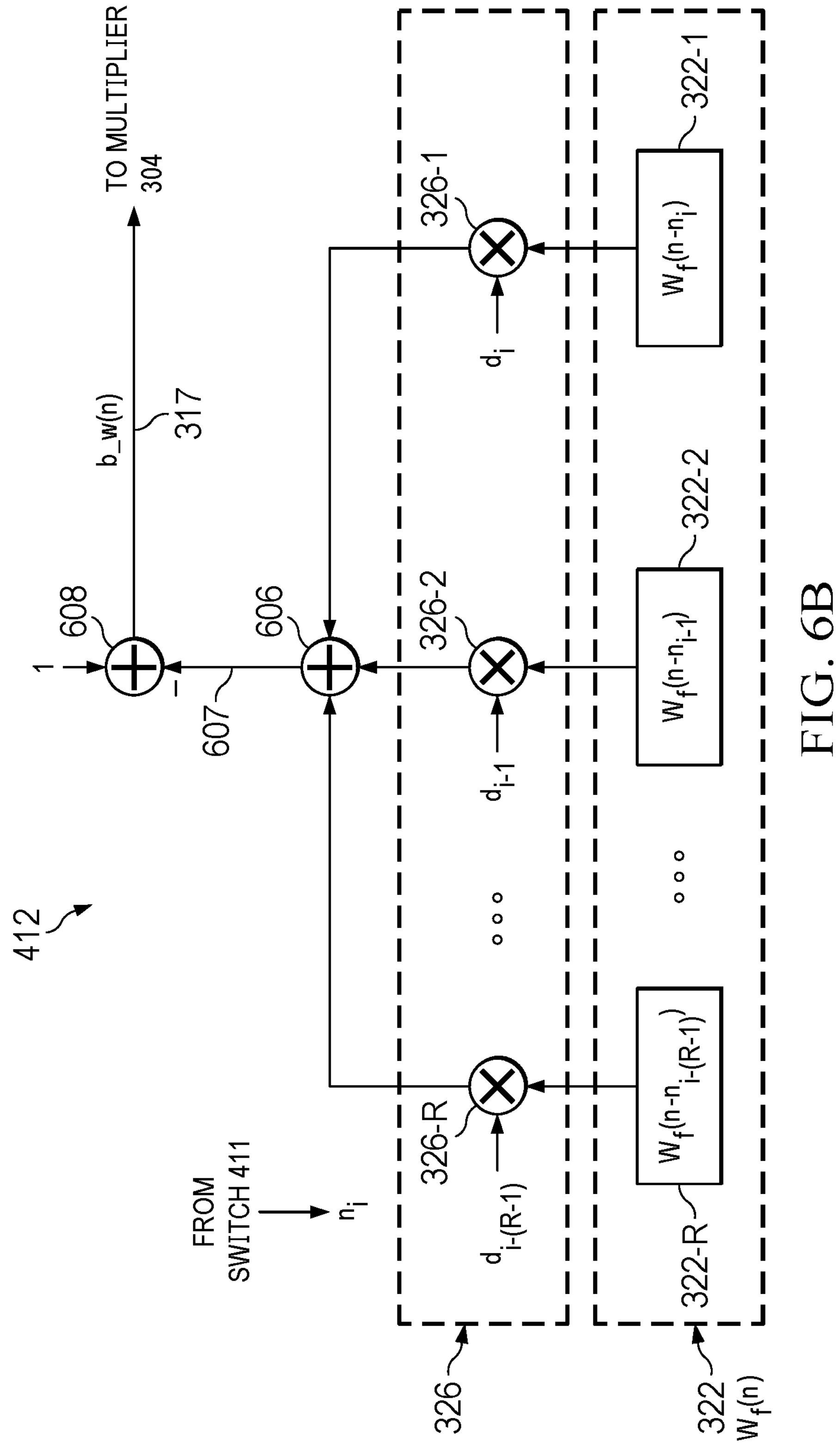
FIG. 6B is a block diagram of an example implementation of the composite waveform generation (CWG) circuitry of FIG. 4 using the waveform of FIG. 6A.

FIG. 6B is a block diagram of an example implementation of the CWG circuitry 412 of FIG. 4. FIG. 6B includes the register 322 and the multipliers 326 of FIG. 3, example adders 606 and 608, and an example signal 607. The multipliers 326 include individual multipliers 326-1, 326-2, . . . , 326-R. The register 322 include indices 322-1, 322-2, . . . , 322-R.

The CWG circuitry 412 produces $b_w(n)$ 317 using the scaling factors produced by the EWG circuitry 410, portions of the shared memory 320 and multiplier pool 324, and parameters determined by the peak attribute extractor circuitry 314. Unlike the EWG circuitry 410, the CWG circuitry 412 runs continuously so that a value of $b_w(n)$ 317 is produced for every sample n. The values used in the computation of $b_w(n)$ 317 change when the value of $n_i$ indicates a new peak has been detected in $|x_{int}(n)|^2$, thereby triggering the CWG circuitry 412 to update.

The CWG circuitry 412 dedicates one index from the register 322 and one multiplier from the multipliers 326 per peak that is attenuated in parallel. Accordingly, the register 322 has R total indices, there are R total multipliers in the multiplier 326. As described above, R may be any positive integer and is implemented between eight and twelve in some examples.

When the values of $n_i$ received from the switch 411 indicate that an i-th peak is detected, the multipliers 326 update the set of weights that are used as inputs. For example, the multiplier 326-1 stops using the weight $d_{i-1}$ as in input and instead uses the weight $d_i$ as soon as it is produced by the EWG circuitry 410. Similarly, in response to the detection if a new peak, the multiplier 326-2 stops using the weight $d_{i-2}$ and starts using the weight $d_{i-1}$ as an input, . . . , and the multiplier 326-R discards the weight $d_{i-R}$ and instead uses the weight $d_{i-(R-1)}$ as in input.

The register 322 stores samples of $w_f(n)$ 600 as described above in connection with FIG. 6A. In addition to updating which weights are used as inputs, the detection of a peak also changes which samples of $w_f(n)$ (e.g., which particular indices of register 322) are used as inputs by the multipliers 326. For example, when updating the value of $b_w(n)$ 317 responsive to the detection of an i-th peak, the multiplier 326-1 uses index 322-1 to obtain $w_f[n-n_i]$, which is a sample of the full copy waveform whose index is given by the difference between the current index and the index of the i-th peak ($n_i$). Similarly, the multiplier 326-2 uses index 322-2 to obtain $w_f[n-n_{i-1}]$, which is a sample whose index is given by the difference between the current index and the index of the (i−1)th peak. In total, the particular samples of $w_f(n)$ obtained by the multipliers 326 are representative of the R most recent peak indices with respect to the current sample index.

When the CWG circuitry 412 is triggered, the multiplier 326-1 multiplies the full copy waveform sample that corresponds to the current peak, $w_f[n-n_i]$, with the weight of the current peak $d_i$. The resulting product is a value that represents what the magnitude of a PLW would be at the current index if the PLW was only cancelling the current peak. Similarly, the other multipliers 326 generate products that represent the magnitude of PLWs that cancel the R most recent peaks. In some examples, the products of the multipliers 326 as shown in FIG. 6B may be referred to as partial results that correspond to respective peaks within the input signal x(n) 201.

The adder 606 adds the individual products of the multipliers 326 into a single value. The adder 608 then subtracts the signal 607, which is the output of the adder 606, from the value 1. In some examples, the signal 607 may be referred to as an output waveform. The resulting sum is a value of $b_w(n)$ 317 that corresponds to sample n from x(n) 201.

Figure 7:
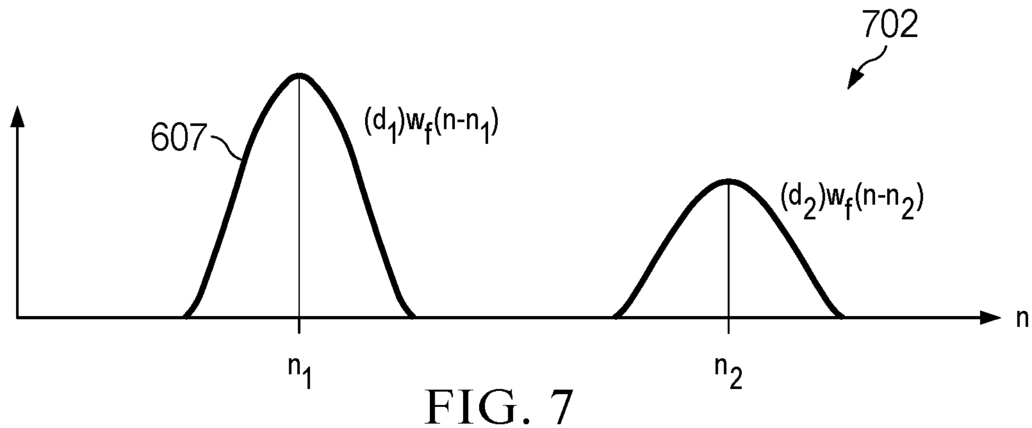
FIG. 7 are graphs of an illustrative example of operations performed by the EWG circuitry and CWG circuitry of FIG. 4.

FIG. 7 are graphs of an illustrative example of operations performed by the EWG circuitry and CWG circuitry of FIG. 4. FIG. 7 includes an example graph 700 and an example graph 702. The graph 700 includes an example |x(n)| signal 704, an example |y(n)| signal 706, and $b_w(n)$ 317. The graph 702 includes the signal 607. The x axes of both graphs 700 and 702 are aligned to the sample index n. In examples described herein, new samples are created through periodic measurements such that n=0 refers to the same point in time across all signals that use the digital sample index n.

In the example of FIG. 7, the |x(n)| signal 704 represents the envelope of the input signal x(n) 201. Similarly, the |y(n)| signal 706 represents the envelope of the input signal x(n) 203. The envelope of a signal refers to a boundary within which the signal is contained when viewed in the time domain. Accordingly, |x(n)| signal 704 and |y(n)| signal 706 contain only nonnegative values.

The graph 700 shows a segment of |x(n)| 704. The segment includes local four local maxima, but only two of the local maxima have values that are above λ, the desired maximum value of |y(n)| 706. Accordingly, the peak attribute extractor circuitry 314 considers the values of $r_i$ and $r_2$ as peaks to be attenuated and does not categorize the other two local maxima as peaks.

The graph 700 shows that $b_w(n)$ 317 has a value of 1 when no peaks are present in |x(n)| 704 and has local minima where peaks are present. In particular, the adder 608 forms $b_w(n)$ 317 as a shifted and reflected version of the signal 607 by performing the operations described above in connection with FIG. 6B.

For a given index n, the multiplier 304 multiplies the value of x(n) 201 with the value of $b_w(n)$ 317 to produce y(n) 203. The resulting modified signal: a) reduces the amplitude of the peaks to λ, thereby lowering the PAR, b) ensures the amplitude reduction is done in a smooth manner in the neighborhood of the peak, thereby maintaining signal integrity, and c) mitigates the amount of distortion that occurs to neighboring samples of x(n) that were already under λ.

The graph 702 shows that the signal 607 includes multiple copies of $w_f(n)$ 600 that are scaled and shifted in time. In particular, one copy of $w_f(n)$ 600 is scaled by $d_i$ and shifted to be centered at $n_i$, the index corresponding to the middle of the first peak. Similarly, a second copy of $w_f(n)$ 600 is scaled by $d_2$ and shifted to be centered at $n_2$, the index corresponding to the middle of the second peak. The weights $d_1$ and $d_2$ are based in part on $a_i$ and $a_2$, the attenuation factors provided by the peak attribute extractor circuitry 314 and are also responsive to the weights of the R previous peaks as described above in connection with FIG. 5B. As a result, if the two peaks of |x(n)| 704 were sufficiently close that the tails of the peaks overlapped in time, the value of $b_w(n)$ 317 would be a nonzero value at that point in time to reflect the effects of both peaks.

Figure 8:
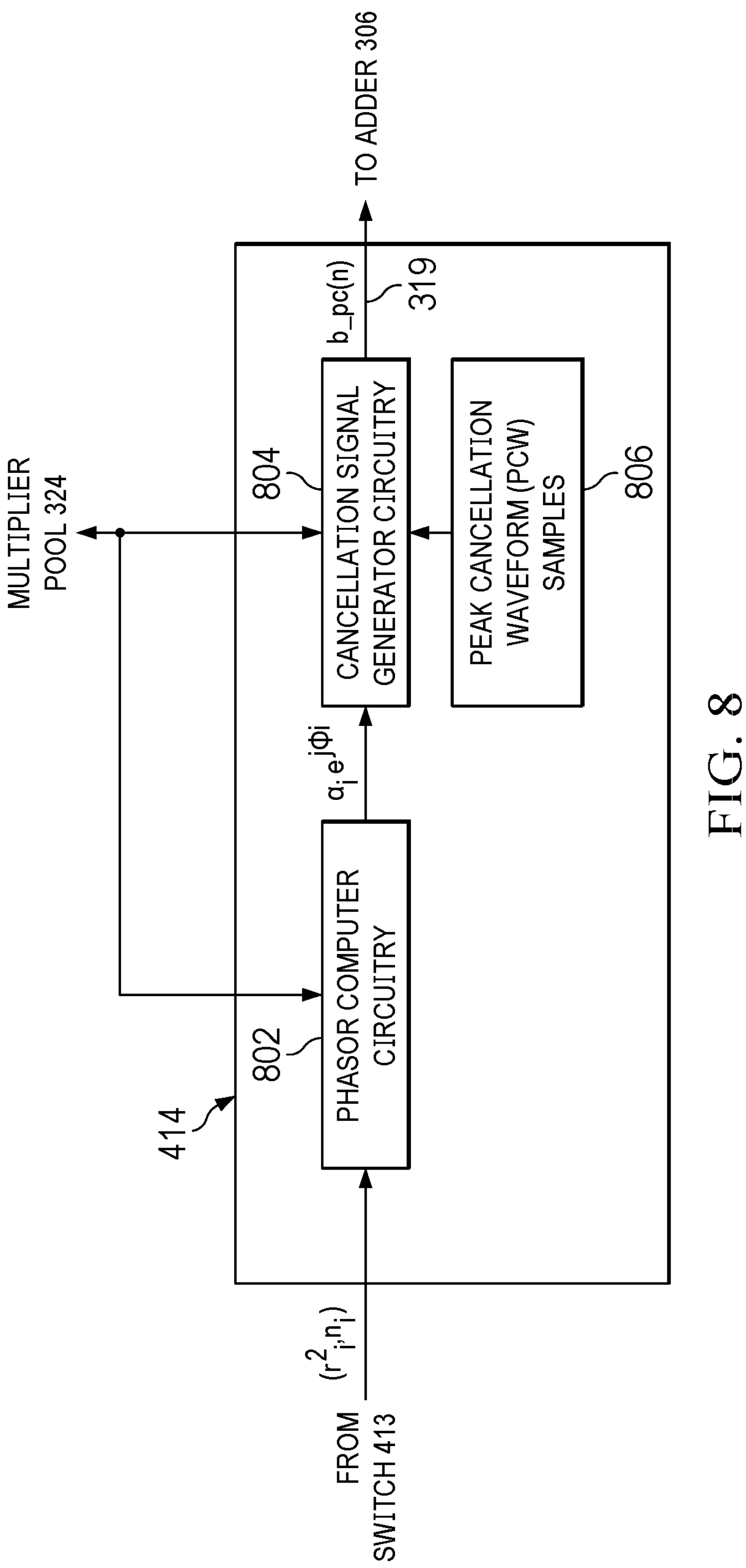
FIG. 8 is a block diagram of an example implementation of the pulse cancelling circuitry of FIG. 4.

FIG. 8 is a block diagram of an example implementation of the PC-CFR circuitry 414 of FIG. 4. The PC-CFR circuitry 414 includes example phasor computer circuitry 802, example cancellation signal generator circuitry 804, and example PCW samples 806.

When the mode selection signal 200 indicates that PC-CFR techniques are used, the phasor computer circuitry 802 obtains a complex sample, $c_i$, of the i-th peak. The peak attribute extractor circuitry 314 stores the real and imaginary components of the PCW in the registers 321 and 322, which the PC-CFR circuitry 414 accesses via the switch 413 as described above. The phasor computer circuitry 802 uses $c_i$ to determine a cancellation phasor given by $a_i e^{j\Phi i}$, where j is the square-root of −1, and i is the index of the current peak and Φi is related to the phase of the complex sample corresponding to the current peak.

The cancellation phasor represents a scaling factor used by the pulse generator circuitry to generate $b_{pc}(n)$ 319. For example, the cancellation signal generator circuitry 804 uses the cancellation phasor to scale and rotate particular values from the PCW samples 806. The PCW samples 806 refer to data points (e.g., complex samples) that collectively form a PCW. Unlike the windowing function in W-CFR techniques, the PCW in PC-CFR techniques is a complex waveform that is responsive to the frequency profile information of the signal. The cancellation signal generator circuitry 804 combines up to R scaled and rotated PCW values to form $b_{pc}(n)$ 319. In some examples, the PCW samples 806 are stored within the memory 320.

The phasor computer circuitry 802 computes $a_i e^{j\Phi i}$ whenever a new peak is detected. The cancellation signal generator circuitry 804 uses up to 4R multipliers to form $b_{pc}(n)$ 319 where R may be any positive integer and is between approximately eight and twelve in some examples as described above. Because the 4R multipliers are part of the multiplier pool 324, they can also be used to form weights $d_i$ or $b_w(n)$ 317 when the mode selection signal 200 indicates W-CFR techniques will be to be used. Similarly, the peak attribute extractor circuitry 314 uses registers 321 and 322 store real and imaginary components of the PCW when PC-CFR is used but store samples of $w_h(n)$ 500 and $w_f(n)$ 600 when W-CFR is used. Accordingly, the CFR circuitry 202 described herein can be implemented using fewer compute resources than other devices that implement PC-CFR and W-CFR as two independent systems.

Figure 9:
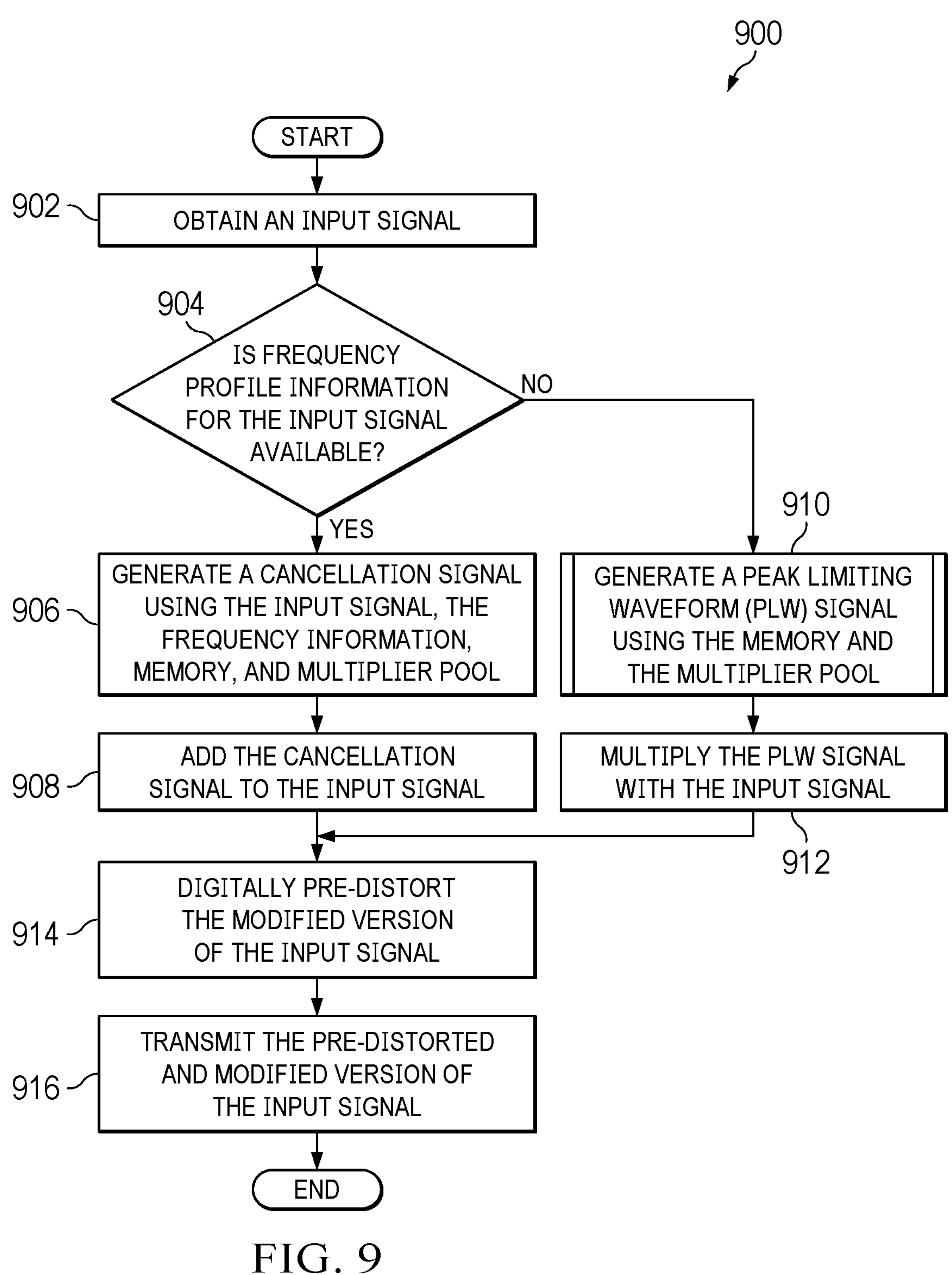
FIG. 9 is a flowchart representative of example machine-readable instructions or example operations that may be executed, instantiated, or performed using an example programmable circuitry implementation of the transmitter circuitry of FIG. 1.

FIG. 9 is a flowchart representative of example machine-readable instructions or example operations 900 that may be executed, instantiated, or performed by programmable circuitry to implement the transmitter circuitry 110 described herein. The example machine-readable instructions or the example operations 900 of FIG. 9 begin when the CFR circuitry 202 obtains an input signal x(n) 201. (Block 902). The input signal x(n) 201 is a digital signal produced by the controller circuitry 108. The input signal x(n) 201 may contain any type and format of information (e.g., text, audio, etc.).

The controller circuitry 108 determines whether frequency profile information for the input signal is available. (Block 904). The frequency profile information describes the spectral occupancy of a signal to be transmitted as described above. In some examples, the frequency profile information is referred to as system level data because it is provided to the CFR circuitry 202 from an external component (e.g., the controller circuitry 108). The frequency profile information is used to perform PC-CFR operations as described above. In some examples, the availability of frequency profile information depends on the type of network device 102 implemented in FIG. 1 as described above.

If frequency profile information is available (Block 904: Yes), the PC-CFR circuitry 414 generates a cancellation signal (e.g., $b_{pc}(n)$ 319) using the input signal, the frequency information, memory 320, and a multiplier pool 324. (Block 906). The cancellation signal of block 906 is referred to above as $b_{pc}(n)$ 319. To generate $b_{pc}(n)$ 319, the PC-CFR circuitry 414 generates a cancellation phasor based on peak attributes of the input signal x(n) 202 and generates PCW samples based on the frequency information. The PC-CFR circuitry 414 then uses the memory 320 and the multiplier pool 324 to scale and rotate the PCW samples based on the cancellation phasor, thereby forming generate $b_{pc}(n)$ 319 as described in FIG. 8. The controller circuitry 108 indicates that frequency profile information is available by setting the mode selection signal 200 to indicate PC-CFR is to be used.

The adder 306 adds the cancellation signal to the input signal x(n) 201. (Block 908). The addition of the $b_{pc}(n)$ 319 cancels out peaks that exist within the envelope of the input signal x(n) 201. As a result, the CFR circuitry 202 produces y(n) 203, a modified version of x(n) 201 that has a lower PAR than x(n) 201 as described above.

If frequency profile information is not available (Block 904: No), the EWG circuitry 410 and CWG circuitry 412 collectively form a PLW signal using the memory 320 and the multiplier pool. (Block 910). The PLW signal of block

910 is referred to above as $b_w(n)$ 317. The controller circuitry 108 indicates that frequency profile information is available by setting the mode selection signal 200 to indicate PC-CFR is to be used. Notably, the EWG circuitry 410 and CWG circuitry 412 collectively form the PLW signal using fewer resources and less space than other devices that use W-CFR techniques. Block 910 is described further in connection with FIG. 10.

The multiplier 304 multiplies the PLW signal of block 910 with the input signal x(n) 201. The multiplication of the PLW signal attenuates peaks that exist within the input signal x(n) 201. As a result, the CFR circuitry 202 produces y(n) 203, a modified version of x(n) 201 that has a lower PAR than x(n) 201 as described above.

Regardless of whether PC-CFR techniques or W-CFR techniques were used previously, the DPD corrector circuitry 204 digitally pre-distorts the modified version of the input signal. (Block 914). The DPD corrector circuitry 204 pre-distorts y(n) 203 to counteract distortion that will occur when z(t) 221 travels across the transmission medium 106. Furthermore, components within the transmitter circuitry 110 can operate more efficiently using y(n) 203 than with x(n) 201 because y(n) 203 has a lower PAR (and therefore increases the utilization of the dynamic range of the circuits).

The PA circuitry 220 transmits the pre-distorted and modified version of the input signal. (Block 916). One or more components may perform operations in between blocks 914 and 916, including but not limited to the TX digital circuitry 210, the TX DAC circuitry 212, and the TX DSA circuitry 218. The example machine-readable instruction or operations 900 end after block 916.

Figure 10:
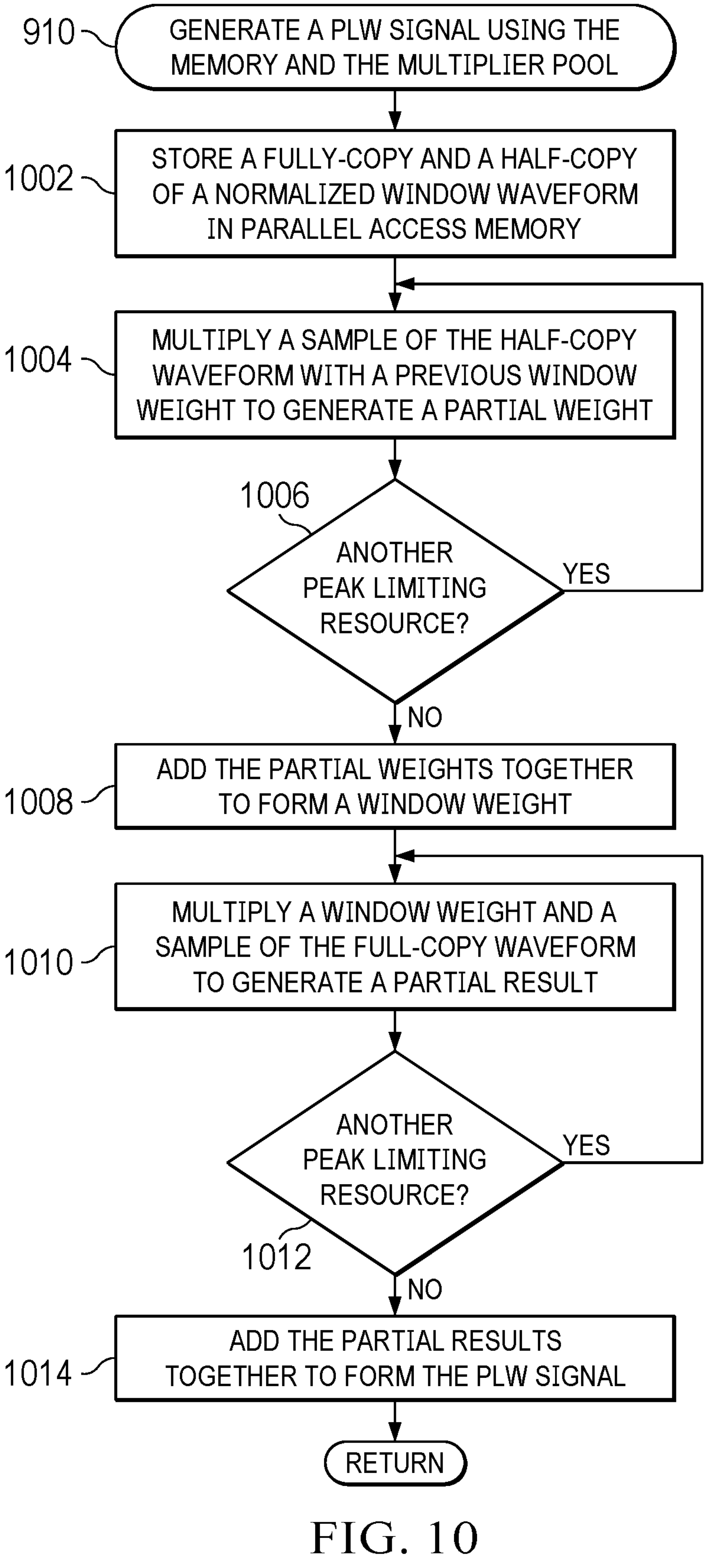
FIG. 10 is a flowchart representative of example machine-readable instructions or example operations that may be executed, instantiated, or performed using example programmable circuitry to generate a peak limiting waveform (PLW) using memory and multipliers as described in connection with FIG. 8.

FIG. 10 is a flowchart representative of example machine-readable instructions or example operations that may be executed, instantiated, or performed using example programmable circuitry to generate a peak limiting waveform (PLW) signal using memory and multipliers as described in connection with FIG. 9. In particular, the flowchart of FIG. 10 provides an example implementation of block 910 of FIG. 9.

Execution of block 910 begins when the PLWG circuitry 316 stores a full copy and a half copy of a normalized window waveform in parallel access memory. (Block 1002). As described above, the full copy of the window waveform, $w_f(n)$ 600, is stored in register 322 and the half copy of the window waveform, $w_h(n)$ 500, is stored in register 321 of FIG. 3. The normalized window waveform may have any standardized shape and may include any number of samples.

The EWG circuitry 410 multiplies a sample of the half copy waveform with a previous window weight to generate a partial weight. (Block 1004). For example, one of the multipliers 325 (e.g., multiplier 325-1) obtains a window weight, d, which represents the relative importance of one of the last R previous peaks (e.g., $d_{i-1}$) that occurred in $|x_{int}(n)|^2$. The same multiplier also obtains a sample from $w_h(n)$ 500 that represents the difference between the sample index of the current peak, $n_i$, and the sample index of a previous peak that corresponds to the obtained weight (e.g., $n_{i-1}$). The partial weight of block 1004, therefore, refers to the output of one of the multipliers 325 as described in FIG. 5B.

The EWG circuitry 410 determines whether another peak limiting resource is used. (Block 1006). As used in the context of block 1006, a peak limiting resource may refer to: a) an index within the tap delay line 502, and b) a multiplier from the multipliers 325, and c) an index from the register 321 that is accessible by the multiplier. In the examples described above and herein, the EWG circuitry 410 uses a total of R−1 peak limiting resources.

If another peak limiting resource is used (Block 1006: Yes), control returns to block 1004 where a different multiplier within the multipliers 325 multiplies a different sample of the half copy waveform with a different previous window weight to generate another partial weight. In the example of FIG. 9, the multiplication of the EWG circuitry 410 is described serially in blocks 1004 and 1006. In other examples, the EWG circuitry 410 performs R−1 multiplication operations in parallel as shown in FIG. 5B.

If another peak limiting resource is not used (Block 1006: No), the EWG circuitry 410 adds the partial weights together to form a window weight d. (Block 1008). In the example of FIG. 5B, the adder 506 adds the products of the multipliers 325 together. The adder 508 then subtracts the sum of the adder 506 from an overshoot factor $(1-a_i)$. The adder 508 then replaces any resulting values that are negative with zero to prevent weights with negative values. The nonnegative number that remains after operations by the adder 508 is the window weight $d_i$, which represents the relative importance of the i-th peak.

The CWG circuitry 412 multiplies a window weight and a sample of the full copy waveform to generate a partial result. (Block 910). For example, one of the multipliers 326 (e.g., multiplier 326-1) obtains a window weight, d, which represents the relative importance of one of the R most recent peaks (e.g., $d_i$) that occurred in $|x_{int}(n)|^2$. The same multiplier also obtains a sample from $w_f(n)$ that represents the difference between the current sample index, n, and the sample index of a previous peak that corresponds to the obtained weight (e.g., $n_i$). The partial result of block 1006, therefore, refers to the output of one of the multipliers 326 as described in FIG. 6B.

The CWG circuitry 412 determines whether another peak limiting resource is used. (Block 1012). As used in the context of block 1012, a peak limiting resource may refer to: a) a multiplier from the multipliers 326, and b) an index from the register 322 that is accessible by the multiplier. In examples described above and herein, the CWG circuitry 412 uses a total of R peak limiting resources, where R as used in the context of the EWG circuitry 410 and the CWG circuitry 412 refer to the same positive integer.

If another peak limiting resource is used (Block 1012: Yes), control returns to block 1010 where a different multiplier within the multipliers 326 multiplies a different sample of the full copy waveform with a different window weight to generate another partial result. In the example of FIG. 9, the multiplication of the CWG circuitry 412 is described serially in blocks 1010 and 1012. In other examples, the CWG circuitry 412 performs R multiplication operations in parallel as shown in FIG. 6B.

If another peak limiting resource is not used (Block 1012: No), the CWG circuitry 412 adds the partial weights together to form the PLW signal. (Block 1014). In the example of FIG. 6B, the adder 606 adds the products of the multipliers 325 together. The adder 608 then subtracts the sum of the adder 606 from the value '1' to form a value for the nth discrete sample within $b_w(n)$ 317. The example machine-readable instructions or operations 900 return to block 912 after block 1014.

Figure 11:
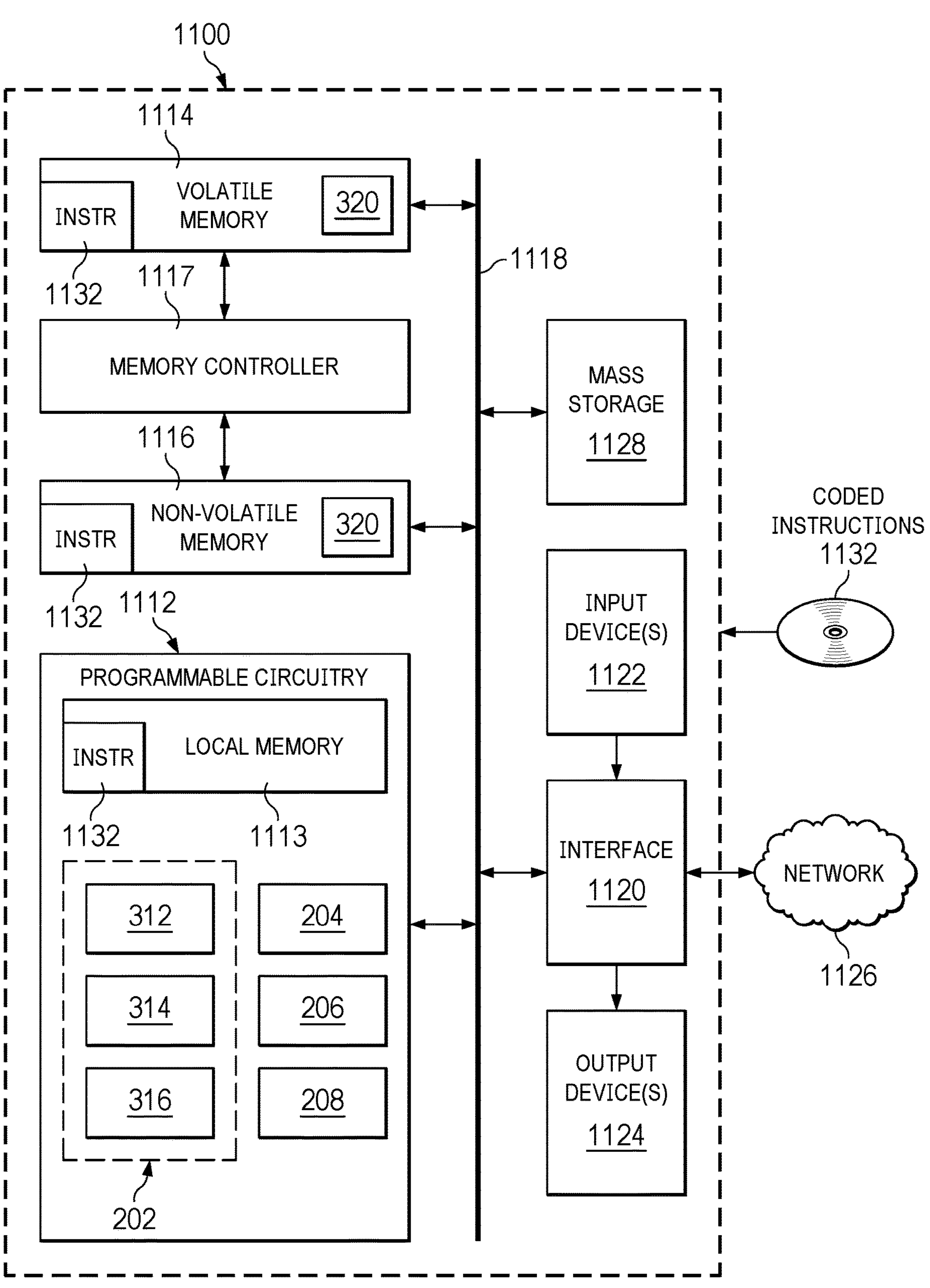
FIG. 11 is a block diagram of an example processing platform including programmable circuitry structured to execute, instantiate, or perform the example machine-readable instructions or perform the example operations of FIGS. 9 and 10 to implement the transmitter circuitry 110 of FIG. 2.

FIG. 11 is a block diagram of an example programmable circuitry platform 1100 structured to execute or instantiate the example machine-readable instructions or the example operations of FIGS. 9 and 10 to implement the transmitter circuitry 110 of FIG. 2. The programmable circuitry platform 1100 can be, for example, a server, a personal computer, a workstation, a self-learning machine (e.g., a neural network), a mobile device (e.g., a cell phone, a smart phone, a tablet such as an iPad™), an Internet appliance, a headset (e.g., an augmented reality (AR) headset, a virtual reality (VR) headset, etc.) or other wearable device, or any other type of computing or electronic device.

The programmable circuitry platform 1100 of the illustrated example includes programmable circuitry 1112. The programmable circuitry 1112 of the illustrated example is hardware. For example, the programmable circuitry 1112 can be implemented by one or more integrated circuits, logic circuits, FPGAs, microprocessors, CPUs, GPUs, DSPs, or microcontrollers from any desired family or manufacturer. The programmable circuitry 1112 may be implemented by one or more semiconductor based (e.g., silicon based) devices. In this example, the programmable circuitry 1112 implements the EWG circuitry 410, the CWG circuitry 412, the PC-CFR circuitry 414, the mode switcher circuitry 318, the CFR circuitry 202, the DPD corrector circuitry 204, the DPD estimator circuitry 206, example capture subsystem circuitry 208, or, more generally, the transmitter circuitry 110.

The programmable circuitry 1112 of the illustrated example includes a local memory 1113 (e.g., a cache, registers, etc.). The programmable circuitry 1112 of the illustrated example is in communication with main memory 1114, 1116, which includes a volatile memory 1114 and a non-volatile memory 1116, by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), or any other type of RAM device. The non-volatile memory 1116 may be implemented by flash memory or any other desired type of memory device. Access to the main memory 1114, 1116 of the illustrated example is controlled by a memory controller 1117. In some examples, the memory controller 1117 may be implemented by one or more integrated circuits, logic circuits, microcontrollers from any desired family or manufacturer, or any other type of circuitry to manage the flow of data going to and from the main memory 1114, 1116. In this example, the main memory 1114, 1116 implements the memory 320.

The programmable circuitry platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, or a Peripheral Component Interconnect Express (PCIe) interface.

In the illustrated example, one or more input devices 1122 are connected to the interface circuitry 1120. The input device(s) 1122 permit(s) a user (e.g., a human user, a machine user, etc.) to enter data or commands into the programmable circuitry 1112. The input device(s) 1122 can be implemented by, for example, an audio sensor, a microphone, a camera (still or video), a keyboard, a button, a mouse, a touchscreen, a trackpad, a trackball, an isopoint device, or a voice recognition system.

One or more output devices 1124 are also connected to the interface circuitry 1120 of the illustrated example. The output device(s) 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, or speaker. The interface circuitry 1120 of the illustrated example, thus, generally includes a graphics driver card, a graphics driver chip, or graphics processor circuitry such as a GPU.

The interface circuitry 1120 of the illustrated example also includes a communication device such as a transmitter, a receiver, a transceiver, a modem, a residential gateway, a wireless access point, or a network interface to facilitate exchange of data with external device (e.g., computing devices of any kind) by a network 1126. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1100 of the illustrated example also includes one or more mass storage discs or devices 1128 to store firmware, software, or data. Examples of such mass storage discs or devices 1128 include magnetic storage devices (e.g., floppy disk, drives, HDDs, etc.), optical storage devices (e.g., Blu-ray disks, CDs, DVDs, etc.), RAID systems, or solid-state storage discs or devices such as flash memory devices or SSDs.

The machine-readable instructions 1132, which may be implemented by the machine-readable instructions of FIGS. 9 and 10, may be stored in the mass storage device 1128, in the volatile memory 1114, in the non-volatile memory 1116, or on at least one non-transitory computer readable storage medium such as a CD or DVD which may be removable.

While an example manner of implementing the CFR circuitry 202 of FIG. 2 is illustrated in FIGS. 3-6, one or more of the elements, processes, or devices illustrated in FIGS. 3-6 may be combined, divided, re-arranged, omitted, eliminated, or implemented in any other way. Further, the delay circuitry 302, the multiplier 304, the adder 306, the mux 308, the interpolator circuitry 310, the envelope computer circuitry 312, the peak attribute extractor circuitry 314, the memory 320, the multiplier pool 324, the EWG circuitry 410, the CWG circuitry 412, and the PC-CFR circuitry 414, or, more generally, the PLWG circuitry 316 and the CFR circuitry 202 of FIGS. 3-6, may be implemented by hardware alone or by hardware in combination with software or firmware. Thus, for example, any of the delay circuitry 302, the multiplier 304, the adder 306, the mux 308, the interpolator circuitry 310, the envelope computer circuitry 312, the peak attribute extractor circuitry 314, the memory 320, the multiplier pool 324, the EWG circuitry 410, the CWG circuitry 412, and the PC-CFR circuitry 414, or, more generally, the PLWG circuitry 316 and the CFR circuitry 202 of FIGS. 3-6, could be implemented by programmable circuitry in combination with machine-readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), or field programmable logic device(s) (FPLD(s)) such as FPGAs. Further still, the example CFR circuitry 202 of FIG. 2 may include one or more elements, processes, or devices in addition to, or instead of, those illustrated in FIG. 2, or may include more than one of any or all of the illustrated elements, processes and devices.

Flowchart(s) representative of example machine-readable instructions, which may be executed by programmable circuitry to implement or instantiate the transmitter circuitry 110 of FIG. 2 or representative of example operations which may be performed by programmable circuitry to implement or instantiate the transmitter circuitry 110 of FIG. 2, are shown in FIGS. 9 and 10. The machine-readable instructions may be one or more executable programs or portion(s) of one or more executable programs for execution by programmable circuitry such as the programmable circuitry 1112 shown in the example programmable circuitry platform 1100 described below in connection with FIG. 11 or may be one or more function(s) or portion(s) of functions to be performed by the example programmable circuitry (e.g., an FPGA). In some examples, the machine-readable instructions cause an operation, a task, etc., to be carried out or performed in an automated manner in the real world. As used herein, "automated" means without human involvement.

The program may be embodied in instructions (e.g., software, firmware, or both software and firmware) stored on one or more non-transitory computer readable or machine-readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), or any other storage device or storage disk. The instructions of the non-transitory computer readable or machine-readable medium may program or be executed by programmable circuitry located in one or more hardware devices, but the entire program or parts thereof could alternatively be executed or instantiated by one or more hardware devices other than the programmable circuitry or embodied in dedicated hardware. The machine-readable instructions may be distributed across multiple hardware devices or executed by two or more hardware devices (e.g., a server and a client hardware device). For example, the client hardware device may be implemented by an endpoint client hardware device (e.g., a hardware device associated with a human or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 9 and 10, many other methods of implementing the example transmitter circuitry 110 may alternatively be used. For example, the order of execution of the blocks of the flowchart(s) may be changed, or some of the blocks described may be changed, eliminated, or combined. Any or all of the blocks of the flow chart may be implemented by one or more hardware circuits (e.g., processor circuitry, discrete or integrated analog or digital circuitry, an FPGA, an ASIC, a comparator, an operational-amplifier (op-amp), a logic circuit, etc.) structured to perform the corresponding operation without executing software or firmware. The programmable circuitry may be distributed in different network locations or local to one or more hardware devices (e.g., a single-core processor (e.g., a single core CPU), a multi-core processor (e.g., a multi-core CPU, an XPU, etc.)). For example, the programmable circuitry may be a CPU or an FPGA located in the same package (e.g., the same integrated circuit (IC) package or in two or more separate housings), one or more processors in a single machine, multiple processors distributed across multiple servers of a server rack, multiple processors distributed across one or more server racks, etc., or any combination(s) thereof.

The machine-readable instructions described herein may be stored in one or more of a compressed format, an encrypted format, a fragmented format, a compiled format, an executable format, a packaged format, etc. Machine-readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, or produce machine executable instructions. For example, the machine-readable instructions may be fragmented and stored on one or more storage devices, disks or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., so that they are directly readable, interpretable, or executable by a computing device or other machine. For example, the machine-readable instructions may be stored in multiple parts, which are individually compressed, encrypted, or stored on separate computing devices, such that the parts when decrypted, decompressed, or combined form a set of computer-executable or machine executable instructions that implement one or more functions or operations that may together form a program such as that described herein.

In another example, the machine-readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions or the corresponding program(s) can be executed in whole or in part. Thus, machine-readable, computer readable or machine-readable media, as used herein, may include instructions or program(s) regardless of the particular format or state of the machine-readable instructions or program(s).

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 9 and 10 may be implemented using executable instructions (e.g., computer readable or machine-readable instructions) stored on one or more non-transitory computer readable or machine-readable media. As used herein, the terms non-transitory computer readable medium, non-transitory computer readable storage medium, non-transitory machine-readable medium, or non-transitory machine-readable storage medium are expressly defined to include any type of computer readable storage device or storage disk and to exclude propagating signals and to exclude transmission media. Examples of such non-transitory computer readable medium, non-transitory computer readable storage medium, non-transitory machine-readable medium, or non-transitory machine-readable storage medium include optical storage devices, magnetic storage devices, an HDD, a flash memory, a read-only memory (ROM), a CD, a DVD, a cache, a RAM of any type, a register, or any other storage device or storage disk in which information is stored for any duration (e.g., for extended time periods, permanently, for brief instances, for temporarily buffering, or for caching of the information). As used herein, the terms "non-transitory computer readable storage device" and "non-transitory machine-readable storage device" are defined to include any physical (mechanical, magnetic or electrical) hardware to retain information for a time period, but to exclude propagating signals and to exclude transmission media. Examples of non-transitory computer readable storage devices and/or non-transitory machine-readable storage devices include random access memory of any type, read only memory of any type, solid state memory, flash memory, optical discs, magnetic disks, disk drives, or redundant array of independent disks (RAID) systems. As used herein, the term "device" refers to physical structure such as mechanical or electrical equipment, hardware, or circuitry that may or may not be configured by computer readable instructions, machine-readable instructions, etc., or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "or" when used, for example, in a form such as A, B, or C refers to any combination or subset of A, B, C such as (1) A alone, (2) B alone, (3) C alone, (4) A with B, (5) A with C, (6) B with C, or (7) A with B and with C. As used herein in the context of describing the performance or execution of processes, instructions, actions, activities, etc., the phrase "at least one of A and B" refers to implementations including any of (1) at least one A, (2) at least one B, or (3) at least one A and at least one B. Similarly, as used herein in the context of describing the performance or execution of processes, instructions, actions, activities, etc., the phrase "at least one of A or B" refers to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or actions may be implemented by, e.g., the same entity or object. Although individual features may be included in different examples or claims, these may possibly be combined, and the inclusion in different examples or claims does not imply that a combination of features is not feasible or advantageous.

As used herein, connection references (e.g., attached, coupled, connected, and joined) may include intermediate members between the elements referenced by the connection reference or relative movement between those elements unless otherwise indicated. As such, connection references do not necessarily infer that two elements are directly connected or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, or ordering in any way, but are merely used as labels or arbitrary names to distinguish elements for ease of understanding the described examples. In some examples, the descriptor "first" may be used to refer to an element in the detailed description, while the same element may be referred to in a claim with a different descriptor such as "second" or "third." In such instances, such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances or other real-world imperfections. For example, "approximately" and "about" may indicate such dimensions may be within a tolerance range of +/−10% unless otherwise specified herein.

As used herein, the phrase "in communication," including variations thereof, encompasses direct communication or indirect communication through one or more intermediary components, and does not require direct physical (e.g., wired) communication or constant communication, but also includes selective communication at periodic intervals, scheduled intervals, aperiodic intervals, or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), or (ii) one or more general purpose semiconductor-based electrical circuits programmable with instructions to perform specific functions(s) or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations or functions, Field Programmable Gate Arrays (FPGAs) that may be programmed with second instructions to cause configuration or structuring of the FPGAs to instantiate one or more operations or functions corresponding to the first instructions, Graphics Processor Units (GPUs) that may execute first instructions to perform one or more operations or functions, Digital Signal Processors (DSPs) that may execute first instructions to perform one or more operations or functions, XPUs, Network Processing Units (NPUs) one or more microcontrollers that may execute first instructions to perform one or more operations or functions or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., or any combination(s) thereof), and orchestration technology (e.g., application programming interface (s) (API(s)) that may assign computing task(s) to whichever one(s) of the multiple types of programmable circuitry is/are suited and available to perform the computing task(s).

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed or hardwired) at a time of manufacturing by a manufacturer to perform the function or may be configurable (or re-configurable) by a user after manufacturing to perform the function or other additional or alternative functions. The configuring may be through firmware or software programming of the device, through a construction or layout of hardware components and interconnections of the device, or a combination thereof.

As used herein, the terms "terminal," "node," "interconnection," "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (e.g., resistors, capacitors, or inductors), or one or more sources (e.g., voltage or current sources) may instead include only the semiconductor elements within a single physical device (e.g., a semiconductor die or integrated circuit (IC) package) and may be adapted to be coupled to at least some of the passive elements or the sources to form the described structure either at a time of manufacture or after a time of manufacture, for example, by an end-user or a third-party.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; or (iv) incorporated in/on the same printed circuit board.

Modifications are possible in the described embodiments, and other embodiments are possible, within the scope of the claims.

From the foregoing, it will be appreciated that example systems, apparatus, articles of manufacture, and methods have been described that switch between PC-CFR techniques and W-CFR techniques responsive to the availability of frequency profile information, and that implement W-CFR using fewer compute resources than other W-CFR techniques Described systems, apparatus, articles of manufacture, and methods improve the efficiency of using a computing device by Example transmitter circuitry includes a shared set of compute resources (e.g., multipliers and memory registers) and uses the shared resources to implement either PC-CFR techniques or W-CFR techniques responsive to the operating mode. When generating a PLW while in W-CFR mode, the example transmitter circuitry computes a scaling factor for a current peak responsive to an overshoot factor of a current peak, sample values from half copy waveforms of previous peaks, and the scaling factors of previous peaks. The example transmitter circuitry then uses the scaling factor of the current peak and sample values from full copy waveforms of previous peaks to compute the overall PLW. Described systems, apparatus, articles of manufacture, and methods are accordingly directed to one or more improvement(s) in the operation of a machine such as a computer, electromechanical device, etc.

What is claimed is:

1. An apparatus to reduce crests in an input signal, the apparatus comprising: memory having a first terminal and a second terminal, the memory configured to store a first copy and a second copy of a normalized window waveform in the memory;

effective waveform weight generation (EWG) circuitry having a first terminal coupled to the first terminal of the memory and a second terminal, the EWG circuitry configured to use the first copy of the normalized window waveform to generate a weight corresponding to a peak in the input signal;

composite waveform generation (CWG) circuitry having a first terminal coupled to the second terminal of the EWG circuitry, a second terminal coupled to the second terminal of the memory, and a third terminal, the CWG circuitry configured to:

use the weight and the second copy of the normalized window waveform to generate an output waveform; and generate a peak limiting waveform responsive to the output waveform; and arithmetic circuitry having a terminal coupled to the third terminal of the CWG circuitry, the arithmetic circuitry to combine the peak limiting waveform with the input signal to reduce an amplitude of the peak.

2. The apparatus of claim 1, wherein:

the memory includes two terminals for parallel access; and the EWG circuitry is configured to access the first copy of the normalized window waveform and the CWG circuitry is configured to access the second copy of the normalized window waveform in parallel.

3. The apparatus of claim 2, wherein:

the peak is a first peak; and the CWG circuitry is further configured to use the second copy of the normalized window waveform to produce the output waveform corresponding to first peak; and in parallel with the production of the output waveform, the EWG circuitry is further configured to use the first copy of the normalized window waveform to produce a weight for a second peak in the input signal.

4. The apparatus of claim 1, wherein:

the peak is a first peak;

the output waveform is responsive to a first partial result corresponding to the first peak; and the CWG circuitry is further configured to add a plurality of partial results together to form the output waveform, the partial results corresponding to respective peaks within the input signal.

5. The apparatus of claim 4, wherein the CWG circuitry is further configured to use the second copy of the normalized window waveform to form the plurality of partial results in parallel.

6. The apparatus of claim 1, wherein to reduce an amplitude of the peak, the CWG circuitry is configured to generate the peak limiting waveform such that, when the peak limiting waveform and the input signal are combined:

local maxima within an envelope of the input signal has a reduced amplitude; and a number of samples within the input signal adjacent to the local maxima have reduced amplitudes.

7. The apparatus of claim 1, wherein:

the weight is a second weight;

the peak is a second peak; and to generate the second weight, the EWG circuitry is further configured to multiply a first weight corresponding to a first peak to a sample from the normalized window waveform, the first peak occurring before the second peak, the sample responsive to the difference in time between the first peak and the second peak.

8. The apparatus of claim 1, wherein:

the normalized window waveform has a shape; and the memory is configured to:

store a full copy of the shape as the second copy of the window waveform; and store a half copy of the shape as the first copy of the window waveform.

9. The apparatus of claim 1, wherein to reduce the amplitude of the peak, the arithmetic circuitry is further configured to multiply the peak limiting waveform to a delayed copy of the input signal.

10. An apparatus comprising:

memory having a first terminal and a second terminal;

windowed crest factor reduction (W-CFR) circuitry having a first terminal coupled to the first terminal of the memory, a second terminal coupled to a second terminal of the memory, and a third terminal, the W-CFR circuitry configured to, responsive to the apparatus being coupled to a first device that provides a first input signal but does not provide frequency profile information corresponding to the first input signal, generate a peak limiting waveform responsive to window functions stored in the memory;

first arithmetic circuitry having a terminal coupled to the third terminal of the W-CFR circuitry, the first arithmetic circuitry to, responsive to the apparatus being coupled to the first device, combine the peak limiting waveform with the first input signal to reduce an amplitude of a peak within the first input signal;

peak cancellation crest factor reduction (PC-CFR) circuitry having a first terminal coupled to the first terminal of the memory, a second terminal coupled to a second terminal of the memory, the PC-CFR circuitry configured to, responsive to the apparatus being coupled to a second device that provides a second input signal and provides frequency information corresponding to the second input signal, use the frequency information and the memory to generate a cancellation signal;

second arithmetic circuitry having a terminal coupled to a third terminal of the PC-CFR circuitry, the second arithmetic circuitry configured to, responsive to the apparatus being coupled to the second device, combine the cancellation signal with the second input signal to reduce the amplitude of a peak in the second input signal; and a multiplexer having a first terminal coupled to the first arithmetic circuitry and a second terminal coupled to the second arithmetic circuitry, the multiplexer configured to provide one of an output of the first arithmetic circuitry or an output of the second arithmetic circuitry to an external device, responsive to whether the apparatus is coupled to the first device or the second device.

11. The apparatus of claim 10, wherein the W-CFR circuitry includes:

effective waveform weight generation (EWG) circuitry having a first terminal coupled to the first terminal of the memory and a second terminal, the EWG circuitry configured to, responsive to the apparatus being coupled to the first device, use a first copy of a normalized window waveform to generate a weight corresponding to a peak in the first input signal; and composite waveform generation (CWG) circuitry having a first terminal coupled to the second terminal of the EWG circuitry, a second terminal coupled to the second terminal of the memory, and a third terminal, the CWG circuitry configured to, responsive to the apparatus being coupled to the first device:

use the weight and a second copy of the normalized window waveform to generate an output waveform; and generate the peak limiting waveform responsive to the output waveform.

12. The apparatus of claim 11, wherein:

the memory is configured to, responsive to the apparatus being coupled to the first device, store the first copy and the second copy of the normalized window waveform; and the first terminal of the memory and the second terminal of the memory are configured for parallel access.

13. The apparatus of claim 10, wherein, responsive to the apparatus being coupled to the second device:

the memory is configured to store real and imaginary components of a peak cancellation waveform, the pulse cancellation waveform responsive to the frequency profile information; and the PC-CFR circuitry is configured to access the real and imaginary components in parallel to generate the cancellation signal.

14. The apparatus of claim 13, wherein:

responsive to the apparatus being coupled to the first device, the W-CFR circuitry is configured to generate the peak limiting waveform by providing samples of the window functions as inputs to a plurality of multiplier circuits; and responsive to the apparatus being coupled to the first device the PC-CFR circuitry is configured to generate the cancellation signal by providing the real and imaginary components as inputs to the plurality of multiplier circuits.

15. The apparatus of claim 10, wherein:

the output of the multiplexer is a modified input signal; and the apparatus further includes:

digital pre-distortion (DPD) corrector circuitry having a first terminal coupled to a third terminal of the multiplexer, the DPD circuitry configured to digitally pre-distort the modified input signal;

power amplifier circuitry having a first terminal coupled to a second terminal of the DPD circuitry, the power amplifier circuitry configured to amplify the pre-distorted version of the modified input signal, the amplification to introduce non-linearity that is counteracted by the pre-distortion; and an antenna having a terminal coupled to a second terminal of the power amplifier circuitry, the antenna configured to transmit the amplified and pre-distorted version of the modified input signal.

16. A non-transitory machine-readable storage medium comprising instructions to cause programmable circuitry to at least:

store a first copy and a second copy of a normalized window waveform in memory;

use the first copy of the normalized window waveform to generate a weight corresponding to a peak in an input signal;

use the weight and the second copy of the normalized window waveform to generate an output waveform;

generate a peak limiting waveform responsive to the output waveform; and combine the peak limiting waveform with the input signal to reduce an amplitude of the peak.

17. The non-transitory machine-readable storage medium of claim 16, wherein:

the memory includes two terminals for parallel access by the programmable circuitry; and the programmable circuitry is further configured to access the first copy and the second copy of the normalized window waveform in parallel.

18. The non-transitory machine-readable storage medium of claim 17, wherein:

the peak is a first peak; and the programmable circuitry is further configured to:

use the second copy of the normalized window waveform to produce the output waveform corresponding to first peak; and in parallel with producing the output waveform, use the first copy of the normalized window waveform to produce a weight for a second peak in the input signal.

19. The non-transitory machine-readable storage medium of claim 16, wherein:

the peak is a first peak;

the output waveform is responsive to a first partial result corresponding to the first peak; and the programmable circuitry is further configured to add a plurality of partial results together to form the output waveform, the partial results corresponding to respective peaks within the input signal.

20. The non-transitory machine-readable storage medium of claim 16, wherein:

the normalized window waveform has a shape; and the non-transitory machine-readable storage medium is further configured to:

store a full copy of the shape as the second copy of the window waveform; and store a half copy of the shape as the first copy of the window waveform.

* * * * *